US007832869B2

(12) United States Patent
Maximus et al.

(10) Patent No.: US 7,832,869 B2
(45) Date of Patent: Nov. 16, 2010

(54) METHOD AND DEVICE FOR PERFORMING STEREOSCOPIC IMAGE DISPLAY BASED ON COLOR SELECTIVE FILTERS

(75) Inventors: Bart Maximus, Oudenaarde (BE); Koen Malfait, Otegem (BE); Koenraad Vermeirsch, Bellegem (BE)

(73) Assignee: Barco N.V., Kortrijk (BE)

( * ) Notice: Subject to any disclaimer, the term of this patent is extended or adjusted under 35 U.S.C. 154(b) by 1244 days.

(21) Appl. No.: 10/576,707

(22) PCT Filed: Oct. 21, 2004

(86) PCT No.: PCT/BE2004/000150

§ 371 (c)(1),
(2), (4) Date: Apr. 21, 2006

(87) PCT Pub. No.: WO2005/039192

PCT Pub. Date: Apr. 28, 2005

(65) Prior Publication Data

US 2007/0127121 A1    Jun. 7, 2007

Related U.S. Application Data

(60) Provisional application No. 60/513,274, filed on Oct. 21, 2003.

(51) Int. Cl.
*G03B 21/14* (2006.01)

(52) U.S. Cl. .............................. 353/7; 353/84; 349/15; 359/464; 348/60

(58) Field of Classification Search ............... 353/7, 353/8, 10, 31, 33, 34, 37, 84, 88, 94; 352/62, 352/63; 349/15; 359/464, 465; 348/51, 348/54, 55, 56, 57, 58, 60
See application file for complete search history.

(56) References Cited

U.S. PATENT DOCUMENTS 4,692,792 A    9/1987   Street

| 4,698,668 A | 10/1987 | Milgram et al. |
| 4,792,850 A * | 12/1988 | Liptoh et al. ................. 348/57 |
| 5,121,983 A | 6/1992 | Lee et al. |
| 5,552,840 A * | 9/1996 | Ishii et al. .................... 348/751 |

(Continued)

FOREIGN PATENT DOCUMENTS

DE        199 24 167        12/2000

(Continued)

OTHER PUBLICATIONS

Cardillo L. et al: "Advancements in 3-D Stereoscopic Display Technologies: Micropolarizers, Improved LC Shutters, Spectral Multiplexing, and CLC Inks", Journal of Imaging Science and Technology, Soc. For Imaging Science and Technology, Springfield, VA, US, vol. 42, No. 4, Jul. 1998, pp. 300-306, XP000990104, ISSN: 1062-3701.

*Primary Examiner*—William C Dowling
(74) *Attorney, Agent, or Firm*—Bacon & Thomas, PLLC

(57) ABSTRACT

In one aspect, the present invention relates to a stereoscopic projection system including a projection device with at least one filter which filters a parameter of the light in a color selective manner. The at least one filter which filters a parameter of the light in a color selective manner has a spectral characteristic for transmitting light in a first wavelength band or set of wavelength bands and for reflecting light in a second wavelength band or set of wavelength bands. The projection device includes a device, such as e.g. a rotating wheel or a sliding filter, for fast synchronized switching between light in different wavelength bands or sets of wavelength bands. In a further aspect, a stereoscopic projection system is provided in which a combination of a first and a second filter mechanism are used, the first filter mechanism being a filter which filters a parameter of the light in a color selective manner, such as a color selective filter or a color selective retarder, and the second filter mechanism preferably being a polarizer or a shutter.

25 Claims, 16 Drawing Sheets

U.S. PATENT DOCUMENTS

| | | | | |
|---|---|---|---|---|
| 5,564,810 A | * | 10/1996 | Larson | 353/8 |
| 5,963,371 A | | 10/1999 | Needham et al. | |
| 5,993,004 A | * | 11/1999 | Moseley et al. | 353/8 |
| 7,040,760 B2 | * | 5/2006 | Nakanishi et al. | 353/20 |
| 7,068,241 B2 | * | 6/2006 | Sato et al. | 345/8 |
| 7,077,524 B2 | * | 7/2006 | Roth | 353/20 |
| 7,180,554 B2 | * | 2/2007 | Divelbiss et al. | 348/742 |
| 7,241,014 B2 | * | 7/2007 | Lippey et al. | 353/8 |
| 7,334,900 B2 | * | 2/2008 | Lu et al. | 353/84 |
| 7,559,653 B2 | * | 7/2009 | Silverstein | 353/7 |
| 2001/0024231 A1 | | 9/2001 | Nakamura et al. | |
| 2002/0021832 A1 | | 2/2002 | Dawson | |
| 2003/0112507 A1 | | 6/2003 | Divelbiss et al. | |
| 2005/0017938 A1 | | 1/2005 | O'Donnell et al. | |
| 2008/0192151 A1 | * | 8/2008 | Ramanath et al. | 348/743 |
| 2008/0239068 A1 | * | 10/2008 | Lipton | 348/60 |
| 2009/0086016 A1 | * | 4/2009 | Su | 348/57 |
| 2009/0096991 A1 | * | 4/2009 | Chien et al. | 353/8 |

FOREIGN PATENT DOCUMENTS

| | | |
|---|---|---|
| DE | 101 31 683 | 2/2003 |
| EP | 1 124 385 A2 | 8/2001 |
| EP | 1 137 293 | 9/2001 |
| EP | 1 178 680 A2 | 2/2002 |
| EP | 1 337 117 | 8/2003 |
| FR | 2 601 466 | 1/1988 |
| GB | 708439 | 5/1954 |
| WO | WO 98/33331 | 7/1998 |
| WO | WO 2004/038457 A2 | 5/2004 |

\* cited by examiner

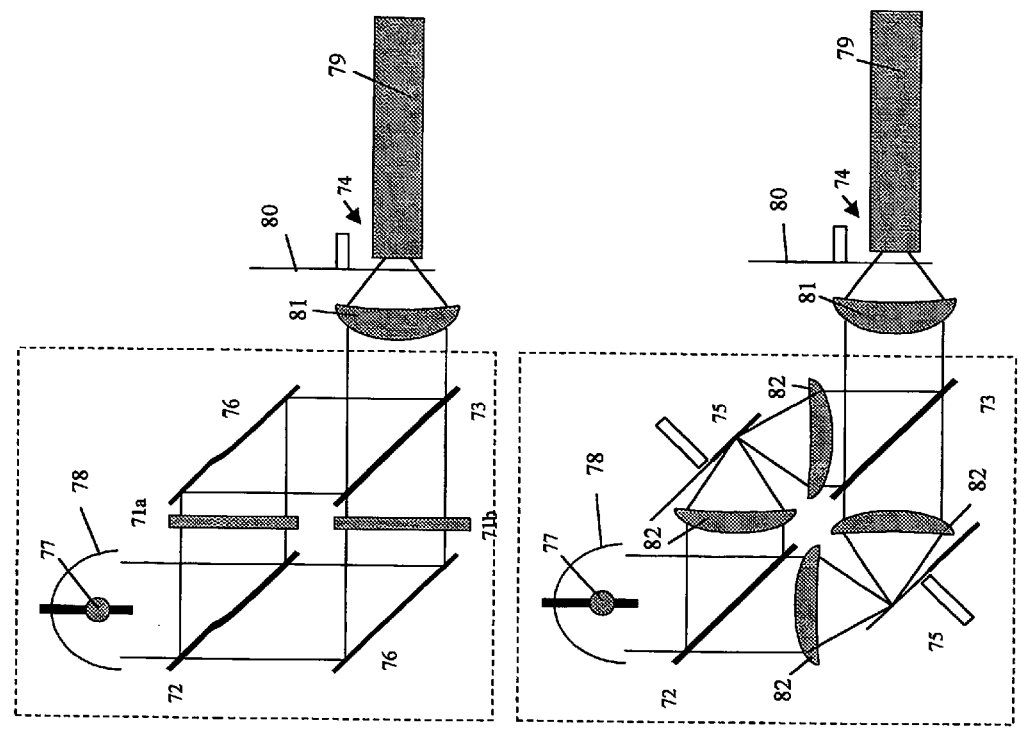
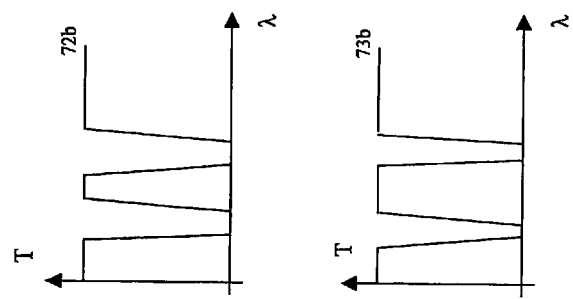
Fig. 7

METHOD AND DEVICE FOR PERFORMING STEREOSCOPIC IMAGE DISPLAY BASED ON COLOR SELECTIVE FILTERS

TECHNICAL FIELD OF THE INVENTION

The present invention relates to methods and apparatus for stereoscopic image display, for example stereoscopic projection, as well as control methods and controllers therefor.

BACKGROUND OF THE INVENTION

Humans and many animals have binocular vision provided by two eyes which look in the same direction. Two parallel aligned but spaced eyes deliver two slightly different images of the same scene. This is due to the 4 to 6 cm separation between the eyes, which makes each eye have a slightly different viewpoint. The images from these two different viewpoints are sent to the brain, and this difference, which is termed parallax, is interpreted as depth. The nearer an object is to the eyes, the greater the difference between the two images. From the difference between the two images, the brain can display an impression of depth.

Stereoscopic image displays, such as stereoscopic projection for example, are based on the same principle: two slightly different images, one for the left eye and one for the right eye, are displayed by some means, e.g. projected onto a screen. A corresponding image modulating system enables the left eye to see only the left eye image, and the right eye to see only the right eye image.

There are at least four types of electronic stereo-3D-devices:
a) devices which produce two different images which are so arranged that the left and right eye can only see the relevant image, such as Helmet Mounted Devices (HMD), virtual reality (VR) headsets, or autostereo displays
b) devices which project a single virtual image at a distance which is viewed by both eyes in a normal way, such as Head-Up Displays (HUD), and
c) viewing glasses which influence the way each eye sees the relevant image on the display. These glasses may have liquid crystal-shutter glasses or polarizers or include color filters such as red and green filters.
d) holographic displays, which enable 3D viewing with the naked eye, wherein no goggles nor special glasses are required. Images from two projectors are combined into a 3D viewing zone. Using holographic techniques, one, two or more viewing zones can be recorded. A "look around" effect can be achieved with additional projectors.

HMDs are basically wearable monitors. To allow stereoscopic vision, an image is projected onto a beam splitter in front of each eye. For VR headsets a miniature liquid crystal display (LCD) can be placed in front of each eye.

In active stereo, i.e. when at least one projection device is used to alternately project images for the one eye and images for the other eye, active obscuration devices such as shutter glasses or shutter screens are used in conjunction with a normal CRT, digital light processing (DLP), or equivalent monitor or projector. The two images required for stereoscopic vision are displayed in turn. For a fraction of a second the image dedicated to the left eye is displayed, after that the image for the right eye appears for the same duration of time, and so on. The job of the glasses is to prevent the left eye from seeing the image dedicated to the right eye and vice versa. To do this, light is blocked by a shutter. The frequency of the shutter is adapted to the frequency of the displayed images. The blocking can be done by having a filter which alternates between opaque and transparent.

The principle of passive stereo displaying, i.e. when at least one, but most often a plurality—e.g. two—of projection devices are used to each project images intended to be seen by a different eye, may be based on the principle of different light polarizations or of differences in frequency (color). For example, the viewer wears passive obscuration devices, i.e. non-switchable obscuration devices, e.g. a pair of glasses containing two oppositely polarized lenses or filters, one for the left eye and one for the right eye. The light from each of two projected images is polarized differently and can pass only through its corresponding filter. If the images are provided by means of a single projector, the projector alternates the left eye information with the right eye information at double refresh rate. A screen in front of the projector's lenses alternates the polarization of the projected image in such a way that the image of each eye passes only through its corresponding polarizing filter of the pair of passive stereo glasses. If the images are provided by means of two projectors, one projector displays the left eye information and the other display the right eye information, both at a standard refresh rate. A polarizing filter mounted in the optical path of each projector ensures that the correct information passes through its corresponding filter in the pair of passive stereo glasses. If the projectors are LCD projectors, they may be internally polarized, thus eliminating the requirement for external filters. The two-projector approach has the added value over the one-projector approach of providing higher brightness.

Passive obscuration devices have the advantage over active obscuration devices that they are less expensive. 3D animation is often performed for a larger audience, to which obscuration devices are distributed. Obscuration devices often tend to disappear, which is very annoying in case they are rather expensive, but does not really matter in case they are e.g. a cheap pair of glasses with colored plastic filters as the lenses.

In DE-199 24 167 a method is described to produce stereoscopic images, enabling 3D-perception of objects on a screen. For this purpose, filters with discrete transmission bands are used, one in green, one in red and one in blue. When two display or projection systems are equipped with different filters, for example filter A and filter B, which do not have a common transmission range, and the viewer uses glasses with the corresponding filters, for example filter A in front of eye 1 and filter B in front of eye 2, the stereoscopic image emerges. However, it is a disadvantage of the method of DE-199 24 167 that very steep filters are required, which are difficult to implement, and that, due to differences in wavelengths for the colors shown to each eye, color artifacts appear in the projected images.

U.S. Pat. No. 4,692,792 describes a stereoscopic apparatus in which the spectral components of each perspective of the image are supplied in sequence and in such a way that whilst the left eye is receiving one spectral component of one of the perspectives, the right eye receives the other spectral component of the other perspective, and in alternating periods the left eye receives the other spectral component of its perspective whilst the right eye receives the first spectral component of its perspective. Various means for producing the image and for viewing the two perspectives are illustrated. One example is a composite RGB signal, which during one frame comprises e.g. an R signal for a first eye, and G and B signals for a second eye, while it comprises during a subsequent frame an R signal for the second eye and G and B signals for the first eye. The viewer sees a display screen through a viewing means which is driven in synchronism with the RGB signal. The viewing means may comprise two rotating tubular cylinders or discs, each having a first sector which transmits red and blocks blue and green, and a second sector which blocks red and transmits blue and green. The two cylinders or discs are rotated in the same direction so that when the red sector of the cylinder or disc is facing the viewer's left eye, the blue-green transmitting sector of the other cylinder or disc is facing the viewer's right eye.

Stereoscopic image display may be used, a.o. in keyhole surgery, in entertainment applications, such as gaming environments, in training environments such as in flight simulators, ship bridge simulators, air traffic control, mission rehearsal simulators, and in visualization of large data-sets, such as in car design for example.

SUMMARY OF THE INVENTION

It is an object of the present invention to provide improvements on stereoscopic projection displays.

The above objective is accomplished by a system according to the present invention.

In a first aspect, the present invention provides a stereoscopic projection system comprising a projection device with at least one filter which filters a parameter of the light in a color selective manner. With "a filter which filters a parameter of the light in a color selective manner" in the present patent application is meant any suitable optical filter which filters a parameter, such as amplitude, frequency or polarisation, of the light in a color selective manner. A "filter which filters amplitude of the light in a color selective manner" is typically known as a color selective filter; i.e. a filter which transmits some wavelengths or wavelength bands of light impinging onto it, and filters out, i.e. reflects and/or absorbs other wavelengths or wavelength bands of light. This type of filter includes optical low pass filters, optical high pass filters or optical band pass filters. A "filter which filters polarisation of the light in a color selective manner" is typically known as a color selective retarder, i.e. a filter which changes the polarization state of the light within a certain wavelength band (or within certain wavelength bands), while it does not change the polarization state of the light outside this wavelength band (or outside these wavelength bands). A "filter which filters frequency of the light in a color selective manner" is known as a fluorescence filter, i.e. a filter comprising an active optical element in which light from a first wavelength or wavelength band is converted into light from a second wavelength or wavelength band. Materials for forming such filters are known and described by N. L. Vekshin in "Energy transfer in macromolecules". Thus "filters which filter a parameter of the light in a color selective manner" include e.g., but not limited thereto, color selective filters, color selective retarders and cholesteric filters. The at least one filter which filters a parameter of the light in a color selective manner has a spectral characteristic for transmitting light in a first wavelength band or set of wavelength bands and for reflecting or absorbing light in a second wavelength band or set of wavelength bands. The projection device according to the first aspect of the present invention comprises a means for fast synchronized switching between light in different wavelength bands or sets of wavelength bands.

The projection device may comprise at least a first filter which filters a parameter of the light in a color selective manner with a first spectral characteristic and a second filter which filters a parameter of the light in a color selective manner with a second spectral characteristic, wherein the projection device comprises a means for fast synchronized switching between the at least first and second filters. The means for fast synchronized switching may for example comprise a rotating wheel or a sliding filter with at least one set of the first and second filters, a solid state filter that can switch from a first characteristic to a second characteristic with a switching time below 5 ms, or a stack of switchable cholesteric filters.

The projection device may project images for a left eye and images for a right eye, in which case the stereoscopic projection system may furthermore comprise a passive obscuration device for discriminating between the images for the left eye and the images for the right eye.

The at least one filter may be a first filter for splitting light in a first light path and a second light path, e.g. a dichroic filter, the means for fast synchronized switching comprising a first shutter in the first light path and a second shutter in the second light path, the operation of the shutters being linked so that the first shutter closes when the second shutter opens and vice versa. The stereoscopic projection system may furthermore comprise a further filter with a characteristic substantially similar to the spectral characteristic of the first filter, the further filter being for combining light from the first and second lightpaths onto a combined lightpath.

The stereoscopic projection system may furthermore comprise means for electronically compensating for color differences between a plurality of signals originating from the projection device. The means for electronically compensating for color differences between a plurality of signals originating from the projection device then comprises means for switching on a left image-right image basis.

In a second aspect, the present invention provides a stereoscopic projection system comprising at least one set of a first and a second stereo projection devices for projecting images onto a common display unit, wherein each of the first and second stereo projection devices are provided with a combination of a first and a second filter mechanism, the first filter mechanism being a filter which filters a parameter of the light in a color selective manner. The first filter mechanism may for example comprise a color selective filter such as an absorption filter, or a color selective retarder. The second filter mechanism may comprise a polarization filter. Polarization filters of the first and the second stereo projection devices may have a substantially orthogonal polarization state, e.g. the polarization filter may of a type which transmits a first type of linear polarization and reflects a second type of linear polarization or it may be of a type which transmits a first handiness of circular polarization and reflects a second handiness of circular polarization. Alternatively the second filter mechanism may comprise a shutter mechanism.

The filters which filter a parameter of the light in a color selective manner of the first and the second passive stereo projection device may have overlapping regions in their spectral characteristic. This is advantageous, as less restringing requirements need to be set on the filters.

A stereoscopic projection system according to an embodiment of the present invention may furthermore comprise passive obscuration devices. The passive obscuration devices may comprise a pair of glasses with a first glass with a first filter mechanism with the same characteristics as the first filter mechanism of the first projection device and with a second filter mechanism with substantially the same characteristics as the second filter mechanism of the first projection device, and a second glass with a first filter mechanism with the same characteristics as the first filter mechanism of the second projection device and with a second filter mechanism with substantially the same characteristics as the second filter mechanism of the second projection device.

Alternatively, when the first projection device projects images for the left eye and the second projection device projects images for a right eye, the projection system may furthermore comprise an active obscuration device for discriminating between the images for the left eye and the images for the right eye. The first projection device may alternately project a first set of images for the left eyes of a first group of observers and a second set of images for the left eyes of a second group of observers, and the second projection device may alternately project a first set of images for the right eyes of the first group of observers and a second set of images for the right eyes of the second group of observers. In that case the active obscuration devices comprise a shutter which is open when the first set of images is displayed and closed when the second set of images is displayed.

A stereoscopic projection system according to embodiments of the present invention may furthermore comprise means for electronically compensating for color differences between a plurality of signals originating from the projection device or projection devices.

A stereoscopic projection system according to embodiments of the present invention may furthermore comprise means for reducing cross-talk in the most photopically contributing color channel of the projection device. The means for reducing cross-talk may comprise a filter which filters a parameter of the light in a color selective manner in the most photopically contributing channel of the projection device. The means for reducing cross-talk may also comprise a first filter which filters a parameter of the light in a color selective manner in the most photopically contributing color channel of the first projection device, and a second filter which filters a parameter of the light in a color selective manner in the most photopically contributing color channel of the second projection device, the first and the second filters showing no overlap in the most photopically contributing color channel. The first and second filters which filter a parameter of the light in a color selective manner may each be a notch filter or a plurality of notch filters.

A stereoscopic projection system according to embodiments of the present invention may have a projection device equipped with a light source with a substantially flat spectral distribution. The projection device may furthermore be equipped with a set of filters such that the combination of light source and set of filters of the projection device is such that the light which is projected by the at least two projection devices onto the common screen can be discriminated by means of an adjusted obscuration device. The light source and the set of filters of each of the at least two projection devices may be such that a multiplication of the spectral distributions of the light projected by the at least two projection devices onto the common screen is substantially close to zero. The set of filters may be stereo filters, e.g. color filters.

The adjusted obscuration device may be a pair of glasses.

The stereoscopic projection system according to embodiments of the present invention may furthermore comprise means for electronically compensating for color differences between light projected from each of the at least two projection devices.

A stereoscopic projection system according to embodiments of the present invention may be of a type wherein the projection device is an LCD or an LCoS device.

A stereoscopic projection system according to embodiments of the present invention may comprise a plurality of stereo projection devices for multiple image stereo applications.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 7 illustrates two embodiments of a stereoscopic imaging system using dichroic filters and a switching means or shutters in the projectors, and corresponding switching means in the obscuration devices.

DESCRIPTION OF THE PREFERRED EMBODIMENTS

Figure 1:
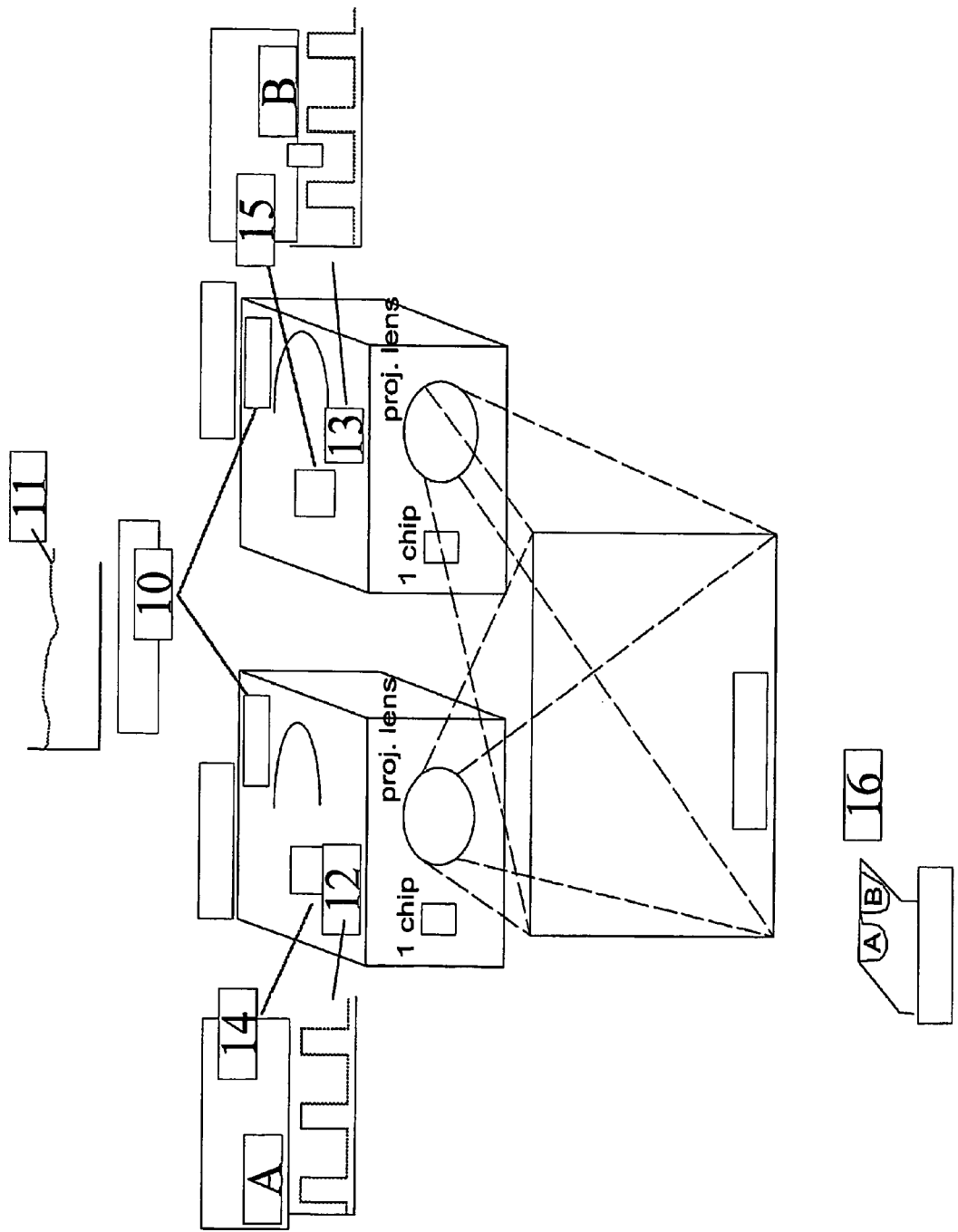
FIG. 1 illustrates stereoscopic projection using a lamp with a substantially flat spectrum and stereo filters, according to a first embodiment of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Embodiment 1

Single chip digital light processing (DLP™)products are currently popular as low price alternatives for 3-chip DLP and liquid crystal display (LCD) products. In single chip DLP projectors the image is created by one Digital Mirror Device (DMD) and the color is added by shining the reflected light through a spinning multi segment color wheel. By using DLP Technology, projectors can be made lighter in weight and smaller in design while also producing contrast ratio's of up to 2000:1 and beyond. Mercury-based high pressure short arc lamps, such as e.g. Ultra High Performance (UHP™) lamps obtainable from Philips, or Super High Pressure (SHP) lamps obtainable from Mitsubishi, are commonly used in these applications due to budget constraints. The spectrum of these lamps is characterized by huge peaks and a modest continuum, despite the high pressure.

Despite the budgetary advantages of the above described family of lamps for single chip projectors, it is preferable, although not restricted thereto, to use a lamp with preferably a substantially flat spectrum in any of the embodiments according to the present invention, which is not limited to single chip DLP projectors. A lamp, suitable for a projection apparatus is in general emitting light in a wavelength band between 300 and 700 nm, and has a spectrum S(λ) such that for $$\lambda \in [300, 700]: \frac{20 \cdot S(\lambda)}{\int_{\lambda-10}^{\lambda+10} S(x) dx} \leq N,$$

where the wavelength λ is expressed in nm, and N represents a constant which can range from 1 to infinity, where the value of N has a direct impact on the quality of the system. We speak of a substantially flat spectrum when N ranges from 1.1 to 2.5 preferably is between 1.1 and 1.5, 1 corresponding to a perfectly flat spectrum. An example of a lamp with a substantially flat spectrum is a Cermax® Xenon lamp obtainable from PerkinElmer. This lamp has huge advantages with respect to the previously mentioned family of lamps. One of the advantages of using a lamp with a substantially flat spectrum is that two adjacent color filters with a comparable width result in nearly equal brightnesses, which is not necessarily the case for UHP-like lamps, where one of the filters can coincide with a lamp peak, while the other doesn't. Another advantage is the fact that the spectrum of for example a Xenon lamp remains unaltered during the lifecycle of the lamp. Therefore, according to the present invention, the use of a lamp with a substantially flat spectrum seems to be more suitable for stereo-applications than the UHP-SHP family of lamps.

Such lamp 10 with a substantially flat spectrum 11 can be combined with stereoscopic techniques that make use of a discrete break up of the projected light spectrum 11 by means of filters A and B, as in the prior art, and as illustrated in FIG. 1, or as in embodiments of the present invention. The location of the filters A and B in further undefined optical systems 12 and 13 respectively in a first projector 14 and a second projector 15 respectively is chosen in such a way that the f-number, i.e. the ratio of the focal length of a lens system to the effective diameter of its aperture, of the light bundle does not cause overlap in the spectral characteristic of the two filters A and B. A part of the spectrum can, by means of adjusted obscuration devices, such as glasses 16 of an observer, containing the similar filters A and B as placed inside the projectors 14 and 15, be witnessed by the left eye, while the right eye sees the remaining information. For single chip DLP purposes, two adjacent projectors 14, 15 with superposed images are needed for viewing 3D-content, one eye seeing the image from the first projector 14, the second eye seeing only the image from the second projector 15. A possible color difference between the two projectors 14, 15 can be compensated for electronically.

Figure 2:
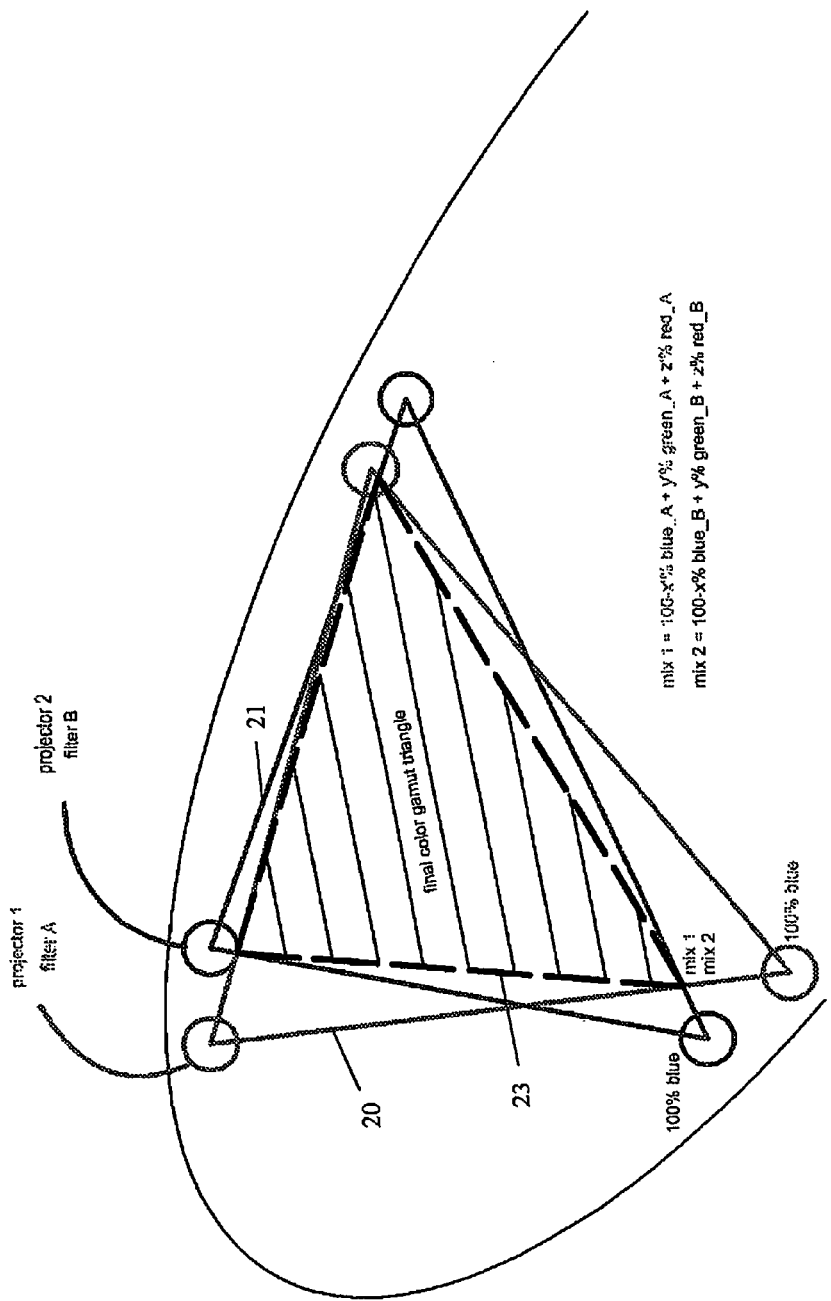
FIG. 2 illustrates color gamut triangles for a first and a second filter on a first and a second projector respectively, and a combined color gamut triangle which can be reached by both projectors provided with the first and the second filter respectively.

On FIG. 2, two color gamut triangles 20, 21 respectively represent the filter A primaries on projector 14 and filter B primaries on projector 15. The white point 5 of both systems will be different. It is however possible to compensate for the discrepancy between the two projectors 14, 15 by only using the 'common' color gamut triangle 23 (hatched triangle).

A matrix M of which all matrix elements are less or equal than 1 can be determined in such a way that a specific color (r1, g1, b1) in the original projector gamut triangle 21 or 22 can be modified to some 'secondary' color (r2, g2, b2) in the common color gamut triangle 23. This way, the original triangle 21, 22 is somewhat projected onto the 'resulting' combined triangle 23:

$$\begin{pmatrix} r2 \\ g2 \\ b2 \end{pmatrix} = \begin{pmatrix} M_{11} & M_{12} & M_{13} \\ M_{21} & M_{22} & M_{23} \\ M_{31} & M_{32} & M_{33} \end{pmatrix} \begin{pmatrix} r1 \\ g1 \\ b1 \end{pmatrix}$$

The translation of this formula to primary colors is demonstrated on FIG. 2. The original blue from the first projector 14, denoted as (0, 0, 100) in some coordinate base of projector 14, is deformed by the matrix M to the common blue (denoted as (z, y, 100-x) in the same coordinate base. Similarly, the original blue from second projector 15, denoted as (0, 0, 100) in some coordinate base of the second projector 15, is deformed by a matrix M' to the common blue (denoted as (z', y', 100-x')).

The above described first embodiment relates to the combined use of lamps 10 with preferably a substantially flat spectrum 11 and the application of stereo filters A, B, i.e. filters which transmit some wavelengths or wavelength bands of light and reflect the other wavelengths or wavelength bands of light.

Embodiment 2

In three chip DLP products, Texas Instruments supports bit sequences suitable for 3D projection, where images for the left eye and for the right eye are successively projected onto a single display device. In addition, some viewing tools with active or passive shutter means (e.g. glasses, lenses) are needed to discriminate images intended to be viewed by one eye from images intended to be viewed by the other.

In the prior art this may be done by using a product called Z-screen® from Stereographics Company, California, but this product uses polarization to separate the two images, which leads to a lower stereoscopic quality than if a color selection method would be used like it is explained in the text below, due to a higher cross-talk between the image for left and right eye. Furthermore, stereo defined by polarization requires non-depolarizing screens (or lowly-depolarizing ones) both for front and retro projection. In that case one is limited to high gain screens (i.e a non-depolarizing Lambertian-like screen does not exist). High gain screens have negative side effects like hot spot effects and a more difficult soft edge blending and are therefore not preferred.

As explained in DE-199 24 167, it is possible to divide the spectrum of light used in discrete bands. According to the present invention, fast synchronized switching between filters with spectral characteristics A (optimized for one eye) and with spectral characteristics B (for the other eye) in a projector allows to use only one projector, that can be linked to an active stereo signal, where the images for the left and the right eye are combined in one signal at a double field rate. With fast synchronized switching is meant that the switching between the filters with different spectral characteristics occurs at a frequency preferably higher than 60 Hz in order not to generate flicker. Such a projector according to an embodiment of the present invention displays stereoscopic images that can be viewed by a pair of passive obscuration devices such as stereo glasses.

Figure 3:
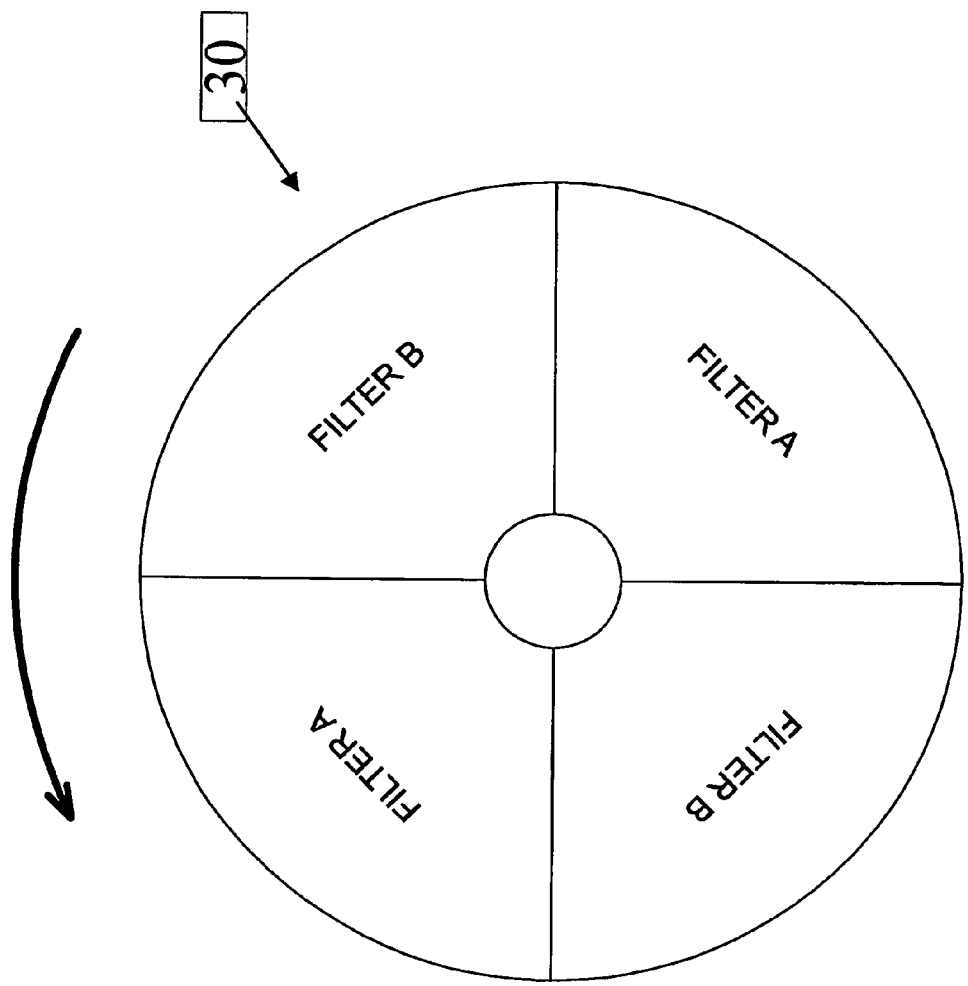
FIG. 3 illustrates a rotating wheel containing two sets of filters with different spectral transmission for use in a stereoscopic imaging device according to an implementation of a second embodiment of the present invention.
Figure 4:
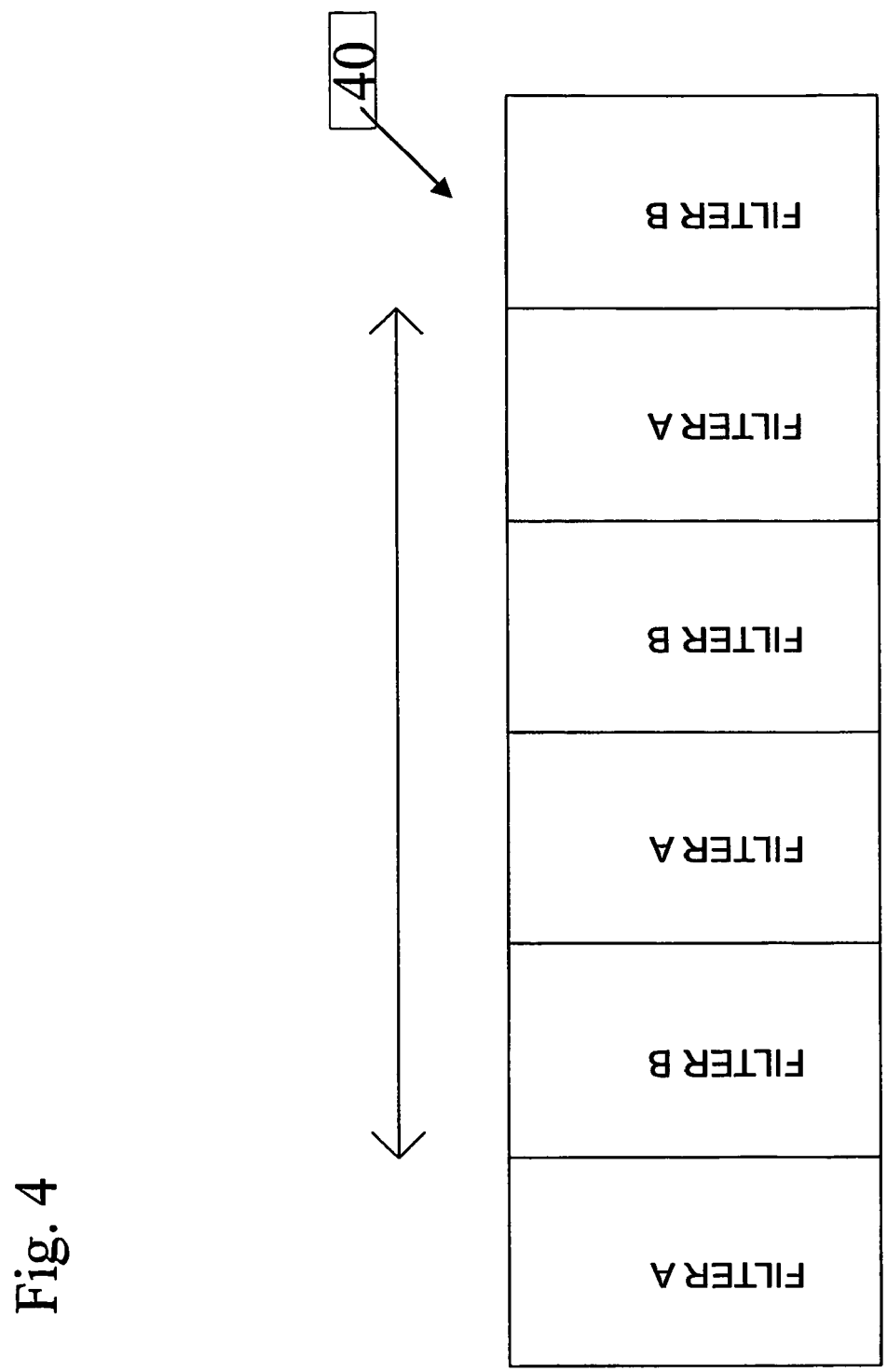
FIG. 4 illustrates a sliding filter containing two sets of filters with different spectral transmission for use in a stereoscopic imaging device according to another implementation of the second embodiment of the present invention.

The fast switching between the said two filter characteristics A and B can be performed as indicated hereinafter. This fast switching is performed before the light hits the screen, preferably it is performed in the projection device.

a mechanical means, like a rotating wheel 30 containing at least one set, thus possibly a multiple amount n of sets, of filters which filter a parameter of the light in a color selective manner, thus having a spectral transmission e.g. like filter A and filter 8, as illustrated in FIG. 3, where as an example, n is taken to be equal to 2, or like a sliding filter 40, comprising at least one set of such filters A and B (as illustrated in FIG. 4). With "filters which filter a parameter of the light in a color selective manner" in this and other embodiments is meant any suitable optical filter which filters amplitude, frequency or polarisation of the light in a color selective manner. A "filter which filters amplitude of the light in a color selective manner" is typically known as a color selective filter; i.e. a filter which transmits some wavelengths or wavelength bands of light impinging onto it, and filters out, i.e. reflects and/or absorbs other wavelengths or wavelength bands of light. This type of filter includes optical low pass filters, optical high pass filters or optical band pass filters. A "filter which filters polarisation of the light in a color selective manner" is typically known as a color selective retarder, i.e. a filter which changes the polarization state of the light within a certain wavelength band (or within certain wavelength bands), while it does not change the polarization state of the light outside this wavelength band (or outside these wavelength bands). A "filter which filters frequency of the light in a color selective manner" is known as a fluorescence filter, i.e. a filter comprising an active optical element in which light from a first wavelength or wavelength band is converted into light from a second wavelength or wavelength band. Materials for forming such filters are known and described by N. L. Vekshin in "Energy transfer in macromolecules". Thus "filters which filter a parameter of the light in a color selective manner" include e.g., but not limited thereto, color selective filters, color selective retarders and cholesteric filters.

Figure 5:
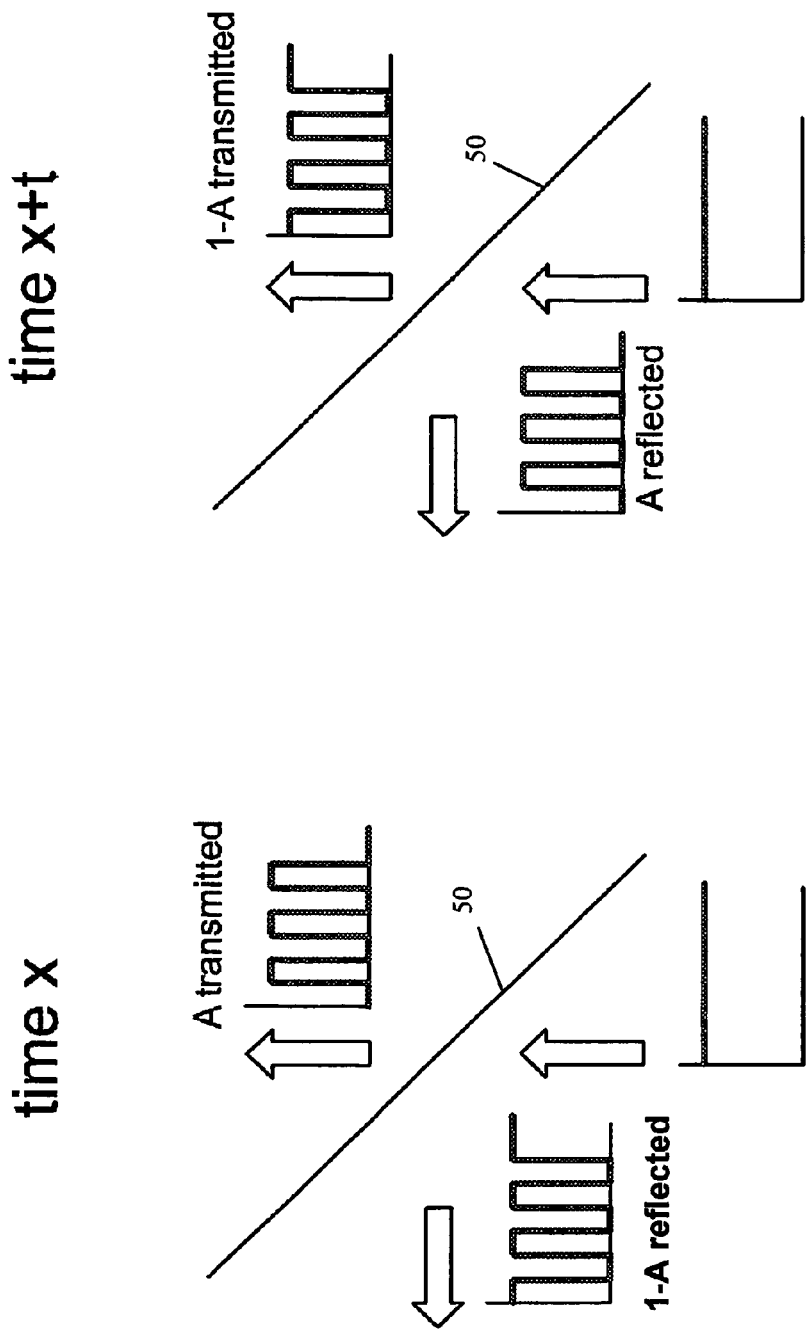
FIG. 5 illustrates a filter which transmits a certain wavelength or set of wavelengths at time x, and reflects the same wavelength or set of wavelengths at time x+t.

According to the present invention, also any other combination of a mechanical device and an electronic driving, different from the color wheel of FIG. 3 or the sliding filter of FIG. 4 is possible. The location of this mechanical device is chosen so that no substantial influence of the transition between filter A and B can be seen on the screen, e.g. by positioning of the mechanics reasonably close to an aperture plane, where the position of the points of intersection of the light rays and the plane describes the angular characteristics of the light ray, but where there is no substantial correlation with the final position on the screen. Also electronic 'dark times' during the 'ghost' transmission can be applied, i.e. when a transition is made from filter A to filter B, there is a certain period of time where a part of the light passes through filter A and a part of the light passes through filter B, which introduces a mixed image on the screen which needs to be blocked out in order to prevent ghost images. This blocking is called 'dark time', i.e. a period of time during which a dark or black image is shown.

by solid state filter solutions such as the Digifilter™ from Digilens Inc., which is presently used to switch between the primary colors red, green and blue, but in another implementation using the same concept also can be used to switch a spectral band of a transmission or reflection characteristic, so that there can be switched between filter A and filter B characteristics, preferably for unpolarized light so that only a minimal portion of the light is lost in case of a DLP projector device. In FIG. 5, an example is shown where a certain filter 50 of the same filter family, but not necessarily a Digifilter™, transmits a certain wavelength at time x, and reflects the same wavelength at time x+t. This filter family comprises all filters that can switch from a certain characteristic to another one on short timescale. Active stereo frequencies typically extend to 120 Hz and higher. The switching time should be a small fraction of that. Typical existing active stereo glasses based have a switching time below 5 ms, e.g. a switching time of between 1 ms and 3 ms. In this invention a similar switching time can work, a faster switching time is better (leads to less crosstalk, dead time, . . . ). In the example shown in FIG. 5, this switch is from transmission of certain wavelengths at time t to reflection of those wavelengths at time x+t. The Digifilter™ filters from Digilens or a combination of the cholesteric filters as described below are examples of such filters, but the invention is not limited thereto and may also include other suitable filters.

by a stack of switchable cholesteric filters that create switchable bandpass and bandstop filters so that together they can compose the filter characteristics A and B. Such switchable or non-switchable cholesteric bandstop or notch filters are available from companies such as Rolic Technologies Ltd, Switzerland.

At present, Texas Instruments does not support analog bit-sequences for single chip DLP, because in a single chip configuration the speed at which the DLP-chip can receive data is too low to switch between images intended for the first eye and for the second eye. In a three-chip configuration, each chip can switch between a signal intended for the first eye and a signal intended for the second eye all the time, as no additional color information needs to be included. For a single chip configuration, all color information has to be included as well. At present, to comprise color information of bit-depth 8, a minimal color wheel segment of about 75 degrees is needed for one color. If additionally also an image for left and right needs to be included, this segment needs to be doubled to about 150 degrees. Red, green and blue segments of 150 degrees each would result in a 450 degrees color wheel, i.e. impossible.

However, it cannot be ruled out that future developments will enable faster switching of the DLPs, such as DMDs, and faster loading of information onto the chips. Eventually, this is expected to become possible.

Figure 6:
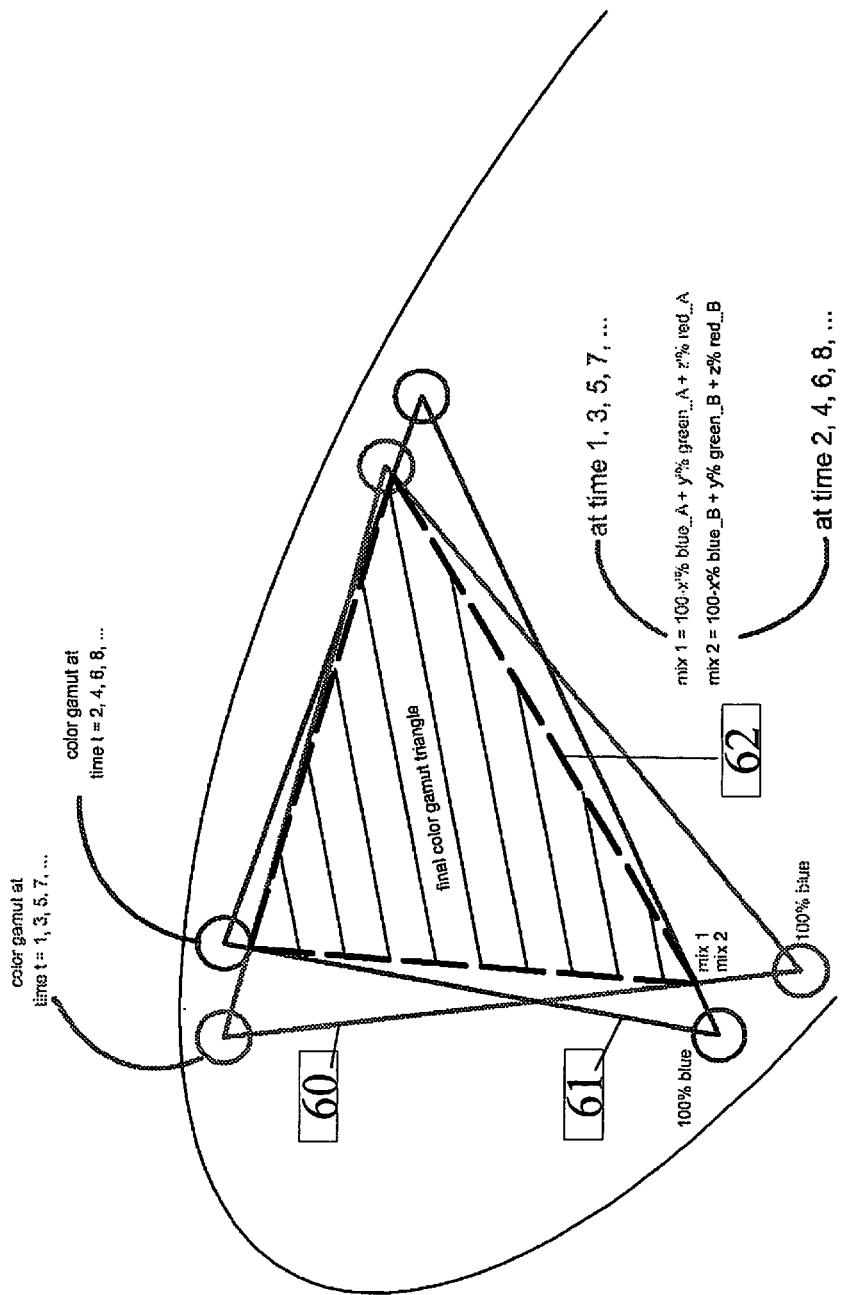
FIG. 6 illustrates that color differences between two signals originating from a same projector can be compensated for electronically by fast processing of the data.

The color difference (primary colors) between the two signals originating from the same projector, i.e. signals showing different color gamut triangles 60, 61 at different times, can be compensated for electronically, by fast processing of the data (see FIG. 6). Processing of the signal similar to the method described above (in embodiment 1), i.e. conversion to the final color gamut triangle 60, may be applied. In case of the fast color switching of the present embodiment, if color correction for the matching of the color gamut is carried out, this correction needs to switch on a left image-right image basis, i.e. the color corrections to be carried out for images intended for the left eye will be different from the color corrections to be carried out for images intended for the right eye. Filter A will thus require another correction than filter B, and as the filters are switching image field per image field, the correction needs to be switched at the same rate as well. This can be realized by alternately loading two sets of correction factors to the real-time color correction processing device present in the projector or in the image generator.

Another preferred embodiment of the described invention in embodiment 2, using two filters which filter a parameter of the light in a color selective manner and switching means is described in FIG. 7. With "filters which filter a parameter of the light in a color selective manner" is meant any suitable optical filter which filters amplitude, frequency or polarisation of the light in a color selective manner, i.e. it makes some changes to color, frequency or polarisation of the incoming light for some colors (thus for some wavelengths or wavelength bands) only—not for the whole spectrum of the incoming light. A "filter which filters amplitude of the light in a color selective manner" is typically known as a color selective filter; i.e. a filter which transmits some wavelengths or wavelength bands of light impinging onto it, and which filters out, i.e. reflects and/or absorbs other wavelengths or wavelength bands of light. A "filter which filters polarisation of the light in a color selective manner" is typically known as a color selective retarder, i.e. a filter which changes the polarization state of the light within a certain wavelength band (or within certain wavelength bands), while it does not change the polarization state of the light outside this wavelength band (or outside these wavelength bands). A "filter which filters frequency of the light in a color selective manner" is known as a fluorescence filter, i.e. a filter in which light from a first wavelength or wavelength band is converted into light from a second wavelength or wavelength band. Materials for forming such filters are known from N. L. Vekshin, "Energy transfer in macromolecules". Thus "filters which filter a parameter of the light in a color selective manner" include e.g., but not limited thereto, color selective filters such as optical low pass filters, optical high pass filters or optical band pass filters, color selective retarders and cholesteric filters. Essentially the "filters which filter a parameter of the light in a color selective manner" in this embodiment are of the color selective kind that has a reflection characteristic that is substantially the complementary characteristic of the transmission characteristic. In this case, the absorption or light loss is very low. One example of such a filter is a dichroic filter.

The top figure shows an implementation with two shutters 71a, 71b, like LCD shutters or alternatives.

Light from the lamp 77 and a preferably parabolic reflector 78 is sent as a substantially parallel bundle towards the illumination optics 74 of a single chip DLP, a 3 chip DLP projector or an LCD projector. The illumination optics 74 can comprise a lightpipe 79, an optional color wheel 80 in case of a single chip DLP projector and a set of lenses 81 as in this example, or to a set of fly-eye lenses combined with other lenses and optional polarization beam arrays.

The light from the lamp 77 is split by a first filter which filters a parameter of the light in a color selective manner, e.g. dichroic filter 72 with a transmission characteristic 72b in function of wavelength, as illustrated on the left hand side of the drawing. The reflection characteristic (not represented in the drawings) of this filter 72 is substantially the complementary characteristic.

The light then follows two paths respectively through the shutters 71a and 71b.

The operation of the shutters 71a and 71b is linked so that shutter 71a closes when shutter 71b opens and vice versa, optionally with some dead time in between. The opening and closing of the shutters 71a, 71b is synchronized to the display of the images for the left eye and the right eye on the light valve or light valves (not represented in the drawings), like the DLP devices, LCD or LCoS (Liquid Crystal on Silicon) devices in the projector. The relation is so that when the image for the left eye is displayed, the shutter 71a, 71b of the channel with the filter (transmitted or reflected) characteristic that matches to the filter on the left eye of the eyewear or obscuration device, is opened. The duty cycle of the shutter 71a, 71b is preferably 50%, but can also deviate, for example if this helps in equalizing the brightness of the left and right image, if in parallel the duty cycle of the display time of the left and right image on the display is modified to the same extent.

After having passed the shutters 71a, 71b, and via some mirror arrangements 76, the two light channels are combined by means of a second filter which filters a parameter of the light in a color selective manner, e.g. dichroic filter 73, with a transmission spectral characteristic 73b, illustrated on the left hand side of the drawing, comparable to the transmission spectral characteristic 72b of the first filter which filters a parameter of the light in a color selective manner, e.g. dichroic filter 72. The transmission characteristics 72b and 73b have to be multiplied to obtain the total filter characteristics A, and the complimentary reflection characteristics of filter 72 and 73 have to be multiplied to obtain the other total filter characteristic B. If a small difference is introduced in the bandpass and bandstop regions of the filters 72 and 73, then it is made sure that the total filter characteristics A and B are substantially divided and show no overlap at all, even for light rays with a non negligible variance on the incident angle compared to the nominal ray. Dichroic or interference filters, which are an example of filters which filter a parameter of the light in a color selective manner, that can for example be used in the embodiment illustrated in FIG. 7, have as a typical property that their spectral transmission and reflection characteristic shift with the incident angle of the light. The origin of this property is the fact that such a filter is composed of a number of layers with different refractive index, and that the optical path length when traveling through these layers will differ for a different angle of incidence. As an example the transmission characteristic will shift to the lower wavelengths if the light incidence is a little bit oblique compared to normal incidence. This effect has to be taken into account when designing the correct filters and when choosing the location to place them in the projectors. Locations where the light incidence on the filters has a big variation are less preferable.

The bottom part of FIG. 7 shows the same basic set-up with the two filters which filter a parameter of the light in a color selective manner, e.g. dichroic filters 72, 73 dividing the light from lamp 77 in two channels, but here a set of lenses 82 are used to focus the light on a small region where a rotating mirror 75 can be placed which acts as a shutter in the corresponding channel. The same rules apply to these kind of shutters as described above, i.e. operation of the shutters is linked so that one closes when the other opens, optionally with some dead time in between, and the opening and closing of the shutters 75 is synchronized with the active obscuration means.

Embodiment 3

This embodiment relates to the use of filters which filter a parameter of the light in a color selective manner, e.g. color selective filters, with mutual overlap, combined with polarization filters. With "filters which filter a parameter of the light in a color selective manner" in this and other embodiments is meant any suitable optical filter which filters amplitude, frequency or polarisation of the light in a color selective manner. A "filter which filters amplitude of the light in a color selective manner" is typically known as a color selective filter; i.e. a filter which transmits some wavelengths or wavelength bands of light impinging onto it, and filtering out, i.e. reflecting and/or absorbing other wavelengths or wavelength bands of light This type of filter includes optical low pass filters, optical high pass filters or optical band pass filters. A "filter which filters polarisation of the light in a color selective manner" is typically known as a color selective retarder, i.e. a filter which changes the polarization state of the light within a certain wavelength band (or within certain wavelength bands), while it does not change the polarization state of the light outside this wavelength band (or outside these wavelength bands). A "filter which filters frequency of the light in a color selective manner" is known as a fluorescence filter, i.e. a filter in which light from a first wavelength or wavelength band is converted into light from a second wavelength or wavelength band. Materials for forming such filters are known from N. L. Vekshin, "Energy transfer in macromolecules". Thus "filters which filter a parameter of the light in a color selective manner" include e.g., but not limited thereto, color selective filters, color selective retarders and cholesteric filters.

The stereo projection and visualization concept described in DE-199 24 167, which is dependent on selection of wavelength bands, has two main disadvantages:

The color selection filters have to have very steep transitions. In the bandpass regions of filter A and B the transmission has to be very high to ensure a good light output of the projector and of the eyewear, while in the bandstop region the transmission has to be very low to avoid overlap between the filter A and filter B. Such overlap will lead to what is called cross-talk between the image meant for the left eye and for the right eye, which leads to a poor stereo effect. These steep transitions can only be achieved with dichroic or interference filters, which have as a typical property that they have a high angle dependency. This angle dependency puts big constraints on the manufacturing of the eyewear (the dichroic filter has to be perpendicular to the eye in every direction one is looking), and on the location of the filter A or B in the light path of the projector.

The filters A and B split every primary color channel of a projector into color sub-channels, with their own set of wavelengths and their own typical hue. This leads to distracting color artifacts on some of the displayed colors. The primary colors can be modified by electronic processing, as explained in embodiment 1, but this leads to a reduction of the saturation of the primary colors and the color gamut of the projectors in general.

The present embodiment uses a combination of polarizing material and filters which filter a parameter of the light in a color selective manner, e.g. color selective filters, to avoid these disadvantages.

The filter material in the first projector of a set of two passive stereo projectors comprises a polarization filter P1 combined with a filter which filters a parameter of the light in a color selective manner, e.g. color selective filter C with bandpass regions substantially equal to filter A. The polarization filter can be of a linear or circular polarization type, e.g. a horizontal linear polarization filter, or a right-handed circular polarization filter.

The filter material in the second projector of the set of two passive stereo projectors comprises a polarization filter P2 with a substantial orthogonal polarization state as the polarization filter P1, combined with a filter which filters a parameter of the light in a color selective manner, e.g. color selective filter D with bandpass and bandstop regions substantially equal to filter B.

Figure 8:
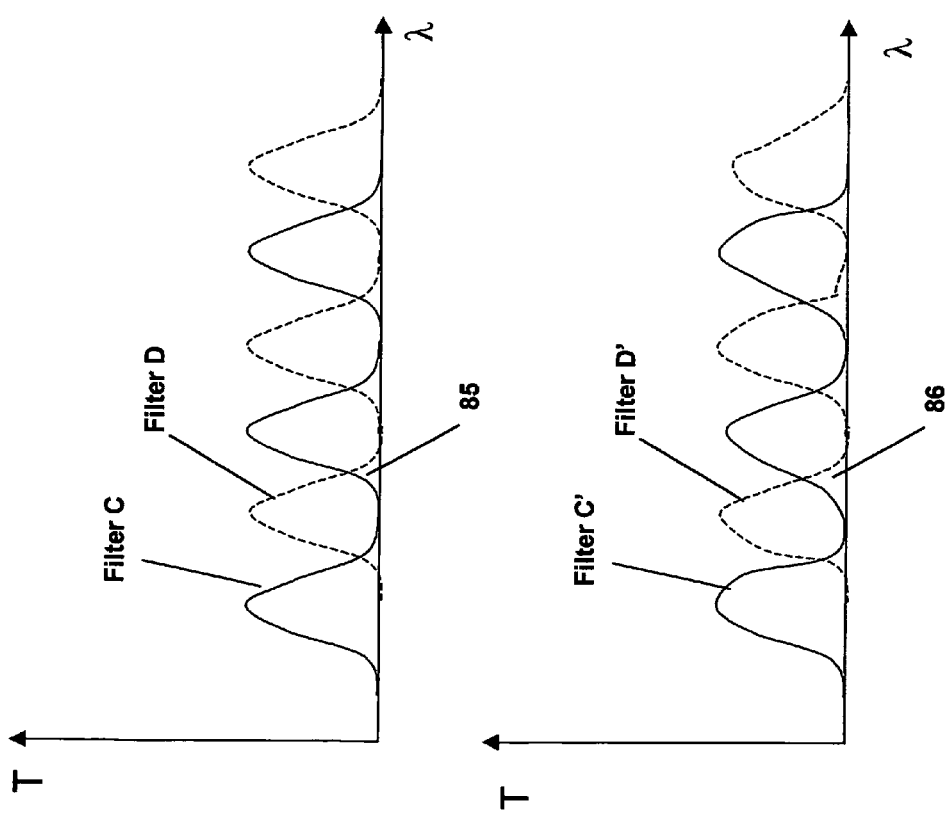
FIG. 8 illustrates an example of spectral characteristics of two overlapping filters for use in both the projectors and the obscuration devices of a stereoscopic imaging device according to a third embodiment of the present invention.

The big difference between filter C and D with respect to filter A and B, is that the filters C and D show overlap regions on purpose, in other words the multiplication of the two spectra of filter C and D is not substantially zero over the complete visible spectrum range. An example of the spectral characteristic of filters C and D (transmittance or reflectance of the filters as a function of wavelength), and the overlap 85 that is generated between them, is shown in FIG. 8.

The eyewear or obscuration means to be used together with such projectors comprises one glass with a polarization filter with the same characteristics as polarization filter P1 in the projector and with a filter which filters a parameter of the light in a color selective manner, e.g. color selection filter C' with substantially the same filter characteristic as filter C. The second glass, for the other eye, comprises a polarization filter with the same characteristics as polarization filter P2 in the projector and a filter which filters a parameter of the light in a color selective manner, e.g. color selection filter D' with substantially the same filter characteristics as filter D. The characteristics of the filters which filter a parameter of the light in a color selective manner, e.g. color selection filters C', D', of the first and second side of the obscuration means may also show an overlap 86.

$$0.5 < \mathrm{int}(C(\lambda) \cdot C'(\lambda))/\mathrm{int}(C(\lambda) \cdot C(\lambda)) < 1$$

$$0.05 < \mathrm{int}(C(\lambda) \cdot D'(\lambda))/\mathrm{int}(C(\lambda) \cdot C(\lambda)) < 0.5$$

$$0.5 < \mathrm{int}(D(\lambda) \cdot D'(\lambda))/\mathrm{int}(D(\lambda) \cdot D(\lambda)) < 1$$

$$0.05 < \mathrm{int}(D(\lambda) \cdot C'(\lambda))/\mathrm{int}(D(\lambda) \cdot D(\lambda)) < 1$$

with int $(x(\lambda))$ denoting the integral over the function x over the total visible wavelength range (380 nm-780 nm).

The values 0.05 and 0.5 are chosen arbitrarily to denote that e.g. filters C and C' have a much better matching than filters C and D', but on the other hand that e.g. the overlap between filters C or C' and D or D' is not 0.

The above property that the filters which filter a parameter of the light in a color selective manner, e.g. color selective filters C and D, overlap each other and therefore can be less steep relaxes the specification of these filters. Interference or dichroic filters are the only practical technology to make very steep filters, and it is known that e.g. "cheaper" absorption filters are less steep. When, according to the present invention, a relaxed steepness specification can be dealt with, no restriction to filters which filter a parameter of the light in a color selective manner, such as dichroic or interference filters, has to be taken into account, and in this way a certain drawback of dichroic or interference filters, which is the angle dependency, can be avoided. So instead of being restricted to use dichroic or interference filters, another choice can be made now for the filter which filters a parameter of the light in a color selective manner for example the absorption filter. A secondary advantage is that, if still dichroic or interference filters would be used, the tolerances on the specified transition wavelengths in the filter transmission curves (sometimes also called the "50% points") can be more relaxed, because now an overlap is permitted. These tolerances can be present because of tolerances in the production process of these filters, and because of the influence of obliquely incident light which causes a shift in the transmission characteristic of such dichroic or interference filters.

The purpose of the combination of polarization filters and filters which filter a parameter of the light in a color selective manner, such as e.g. color selection filters, is that the properties of both filter technologies can be added together resulting in a higher quality separation between images for the left eye and images for the right eye, and thus a reduction of crosstalk.

The relaxation of the specification on the filters which filter a parameter of the light in a color selective manner, e.g. color selection filters, with the acceptance of an overlap 85 between the two filter characteristics, leads to a smaller distinction of the primary colors of the 2 projectors.

On the other hand, the extra left eye-right eye separation performed by the use of the filters which filter a parameter of the light in a color selective manner, e.g. color selection filters, on top of the polarization filters results in a lower quality loss of the stereo separation when the image is displayed on a depolarizing screen.

Examples of filter characteristics for filters C and D, C' and D' are shown in FIG. 8.

The method explained in this third embodiment can be implemented for both single chip and 3 chip DLP projectors.

The method can be used with even more success in LCD or LCoS projectors, where the light which exits the projector is already substantially polarized because both the LCD and LCoS devices require polarized light for their operation. The polarization filters P1 and P2 can in that case be present or can be replaced by one or more (a set of) retardation filters that modify the polarization state in general or separately in the three color channels into a polarization state required for the left or right glass of the eyewear.

In case of 3 chip DLP or 3 panel LCD or LCoS projectors, the filters which filter a parameter of the light in a color selective manner, e.g. color selective filters, with characteristics C and D can be formed by three separate filters placed in the three different color channels, which together form the filter characteristic C and D after color recombination in the projector.

The combination of polarizing filters and filters which filter a parameter of the light in a color selective manner, such as color selection filters, in the projector and in the eyewear can alternatively also be realized by a combination of polarizers or retarders and bandpass cholesteric filters as they are available from the company Rolic.

Embodiment 4

An important drawback of the color selection filters A and B as described in DE-199 24 167 are the constraints imposed by the manufacturing process. The more complicated the filter characteristics, the more layers that are needed and so the more complicated the manufacturing process. This leads to a very costly design. One way to reduce cost in case of 3 chip DLP projectors or 3 panel LCD or LCoS projectors is to make three separate filters that are placed in the three different color channels, as remarked in embodiment 3.

The present embodiment reduces cost even more by focusing on the light output of a projector. The color balance R, G, B of a typical projector is substantially close to 2:7:1. This means that the amount of green light is 3.5 times as high as the amount of red light and 7 times as high as the amount of blue light. The cross-talk for stereoscopic projectors on the other hand is determined by the amount of light intended for one eye entering the other eye.

Supposing a stereoscopic method different from the one with filters which filter a parameter of the light in a color selective manner, such as color selection filters, is used, then when a white image is presented to one eye and a black image to the other eye, the cross-talk can be calculated as $$(YR+YG+YB)/(\alpha*(YR+YG+YB))=1/\alpha$$

in which it is supposed that $\alpha$ which represents the cross-talk of an individual channel, is the same for each of these channels.

To improve, i.e. reduce or eliminate, the cross-talk, according to the present invention the stereo quality of the channel with the highest light output, i.e. the quality of the channel of the most photopically contributing color, is improved, in the given example the green channel. The idea behind this invention is that the cross-talk consists of three contributions, one of each color channel. The general stereo quality can be improved by reducing the most photopically important contribution. By concentrating on one single channel, a much simpler color filter can be used, which is favorable for both design and cost issues.

Figure 9:
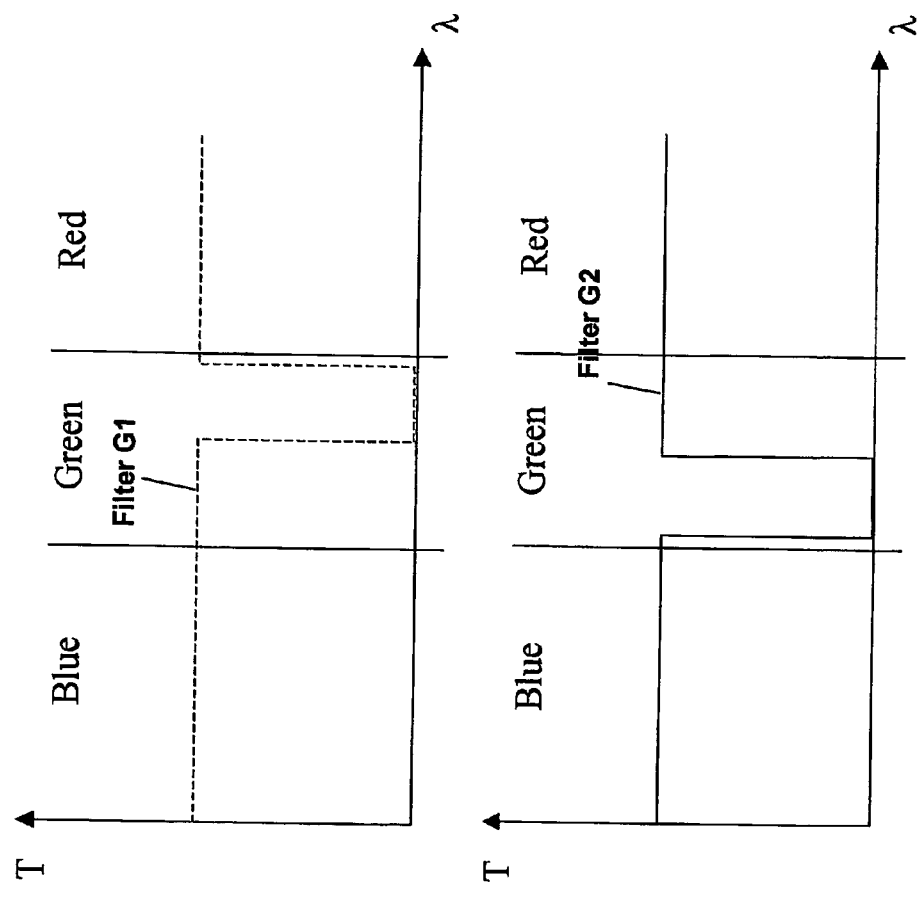
FIG. 9 illustrates transmission characteristics of color selection filters for use in a stereoscopic imaging device according to a first implementation of a fourth embodiment of the present invention.

This quality improvement according to the present invention is realized by inserting a filter which filters a parameter of the light in a color selective manner, e.g. color selection filter of type G1, i.e. a filter which only transmits part of the green light (as illustrated at the top of FIG. 9), in the green channel of a first projector of a set of for example two stereoscopic projectors. This filter G1 can be considered as a notch filter, i.e. a filter which removes a slice of wavelengths of light. The design of such a filter is much simpler than the design of the color selection filters described in DE-199 24 167 and so the cost will be much lower.

The same notch filter G1 is added in the obscuration device for the eye corresponding with the described first projector.

In front of the other eye and in the green channel of the second projector a notch filter G2 (illustrated at the bottom of FIG. 9) is added. It is necessary that there is no overlap between the two filters G1, G2, in their transmission characteristic in the green channel as only then a significant improvement of the cross-talk is possible. A trade-off can be made between cross-talk reduction and loss of light. The bigger the separation between the two filters G1 and G2, the better the cross-talk reduction, but the higher the light loss will be. For an optimum cross-talk reduction, the whole green wavelength area must be covered, i.e. light in the green channel must only be transmitted by filter G1 or by filter G2 or by none of those filters.

Supposing that the separation between the two notch filters G1, G2 is large enough so that cross-talk can be neglected, i.e. β, which represents the cross-talk in the cross-talk improved channel, in the present example the green channel, is very close to zero, the cross talk can be calculated as $$(YR + YG + YB)/(\alpha * YR + \beta * YG + \alpha * YB) \sim\sim > (YR + YG + YB)/$$
$$(\alpha * (YR + YB))$$
$$\sim\sim > 10 * YB/(\alpha * (3 * YB))$$
$$\sim\sim > 10/3 * \alpha$$

By using only one simple filter which filters a parameter of the light in a color selective manner, e.g. color selective filter, per projector, G1 being inserted in the first projector and G2 being inserted in the second projector, the cross-talk has been improved more than three times. A similar technique, with suitable filters for the respective channels, can also be applied to the red or blue channel dependent on which color limits the cross-talk.

Figure 10:
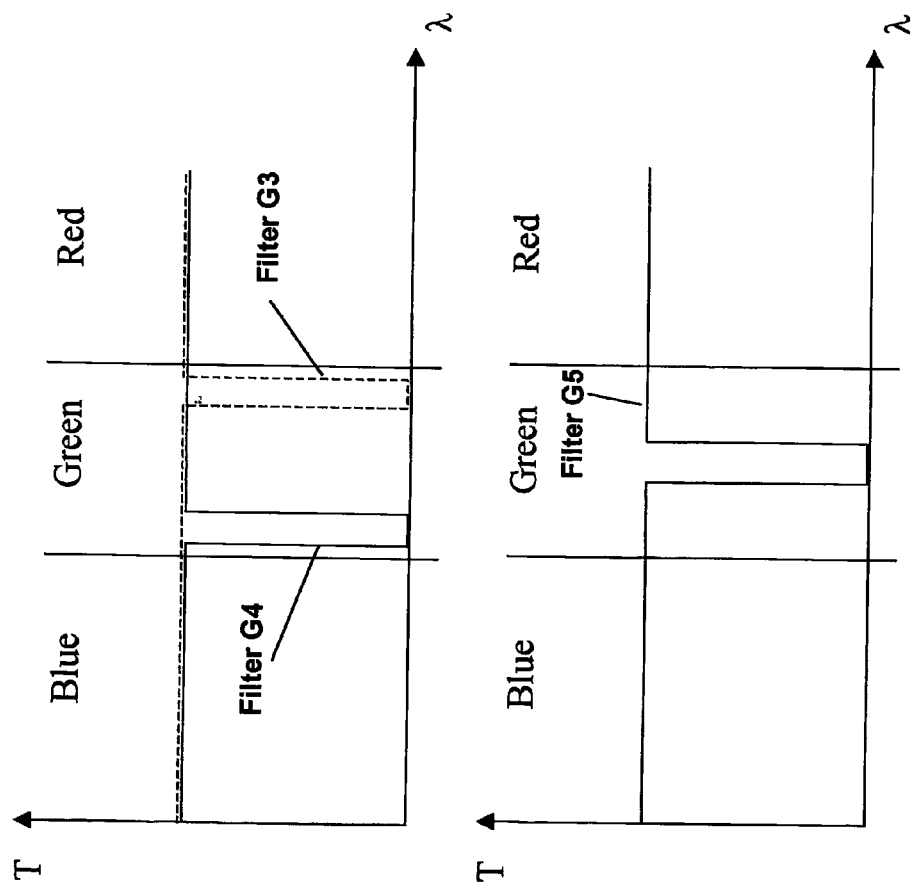
FIG. 10 illustrates transmission characteristics of color selection filters for use in a stereoscopic imaging device according to another implementation of the fourth embodiment of the present invention.

It is also possible to combine a number of notch filters to achieve more complicated characteristics. This may be interesting to reduce the color shift that is inherent to the filtering technique. In FIG. 10 a combination of notch filters G3, G4, G5 is represented to reduce the green color shift between the two stereoscopic projectors. The filter combination G3, G4 is inserted in the green channel of one projector and is put in the obscuration device in front of the corresponding eye. The filter G5 is inserted in the green channel of the other projector and is put in the obscuration device in front of the other eye.

It is also possible (although not represented in the drawings) to combine a notch filter set active in one channel with a set which is active in another channel.

Embodiment 5

In this embodiment a dual image passive stereo application is described.

As an example only, four projectors of a stereoscopic imaging system are equipped as follows:
1) Projector 1 with polarization filter P1 and filter which filters a parameter of the light in a color selective manner, e.g. color selection filter A
2) Projector 2 with polarization filter P1 and filter which filters a parameter of the light in a color selective manner, e.g. color selection filter B
3) Projector 3 with polarization filter P2 and filter which filters a parameter of the light in a color selective manner, e.g. color selection filter A
4) Projector 4 with polarization filter P2 and filter which filters a parameter of the light in a color selective manner, e.g. color selection filter B The observers are divided into two groups:
1) Group 1 wearing eyewear with polarization filter P1 on both eye glasses combined with a filter which filters a parameter of the light in a color selective manner, e.g. color selection filter A on the one eye and a filter which filters a parameter of the light in a color selective manner, e.g. color selection filter B on the other eye.
2) Group 2 wearing eyewear with polarization filter P2 on both eye glasses combined with a filter which filters a parameter of the light in a color selective manner, e.g. color selection filter A on one eye and a filter which filters a parameter of the light in a color selective manner, e.g. color selection filter B on the other eye.

The 4 projectors are all projecting an image on one and the same screen or projection device with low depolarization properties.

With the proper supply of images to the four projectors, the first group of observers will see one stereo image, projected by projectors 1 and 2, and the second group will see another stereo image, projected by projectors 3 and 4. The amount of different viewpoints can be increased from 2 to e.g. 3 or more by, instead of dividing the spectrum of the lamp into two wavelength bands or sets of wavelength bands by means of filters A and B, dividing it into more discrete non-overlapping spectral parts, e.g. a first, a second and a third wavelength band or set of wavelength bands, obtained by spectral filters A, B and C respectively. A fifth and sixth projector are then needed, the fifth projector (not represented in the drawings) with polarization filter P1 and a filter which filters a parameter of the light in a color selective manner, e.g. color selection filter C, and the sixth projector with polarization filter P2 and a filter which filters a parameter of the light in a color selective manner such as color selection filter C. This idea can also be implemented in a projection means as described in embodiment 2, where instead of a fast switching device consisting of filter A and B, another switching device consisting of three filters A, B and C or more than three is used.

Embodiment 6

In this embodiment, a further dual image stereo application is described.

As an example, two projectors with the ability to display active stereo images with an active stereo frame rate (e.g. 96 Hz or 120 Hz) are equipped as follows:
1) Projector P1 with a filter which filters a parameter of the light in a color selective manner, e.g. color selection filter A
2) Projector P2 with a filter which filters a parameter of the light in a color selective manner, e.g color selection filter B Again, the observers are divided into two groups: both groups 1 and 2 are wearing eyewear or obscuration devices with different filters which filter a parameter of the light in a color selective manner on the left and right eyes, e.g. color selection filter A on the one eye and color selection filter B on the other eye, and with a shutter system.

Figure 14:
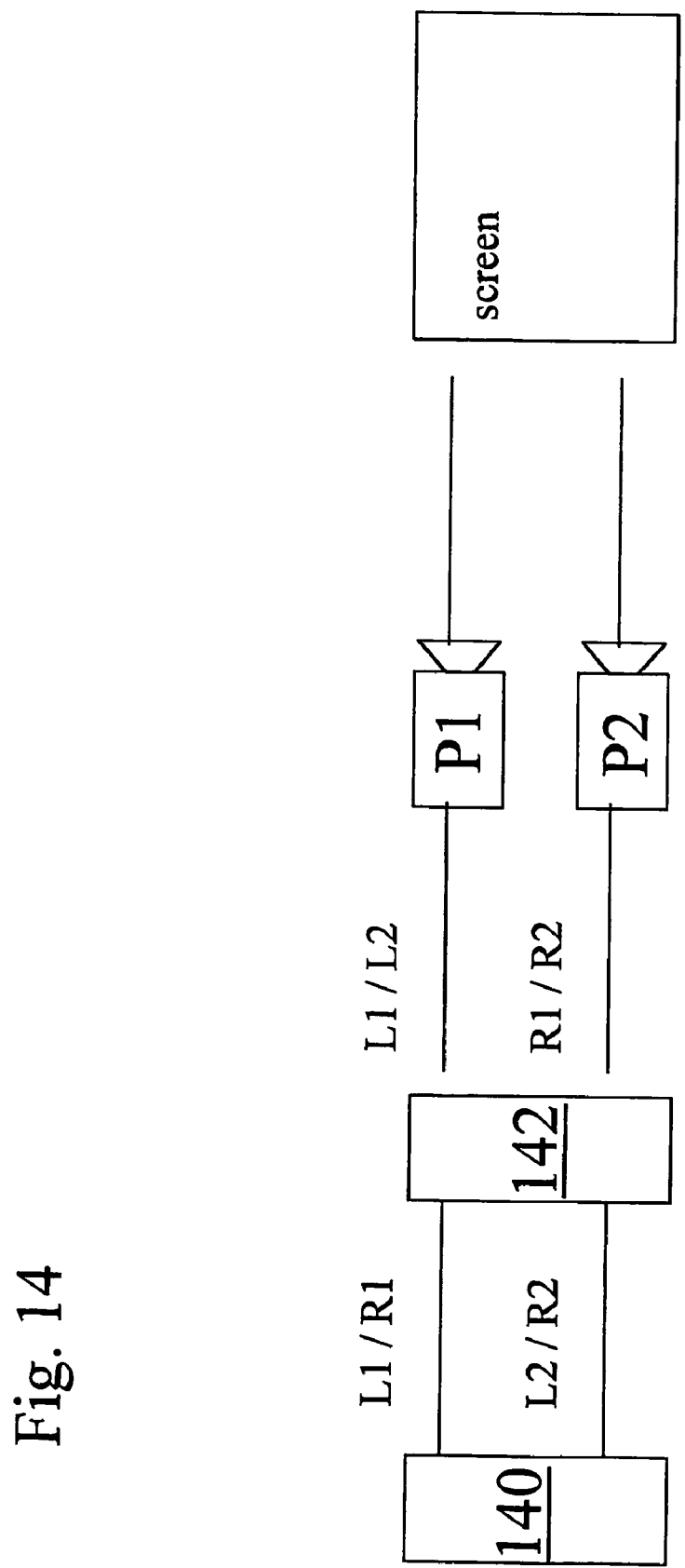
FIG. 14 illustrates a stereoscopic imaging system according to a sixth embodiment of the present invention.

An image generator 140 (see FIG. 14) or a plurality of image generators generate two active stereo image signals meant for two different groups of users (i.e. e.g. two stereo images to be looked at from different viewpoints). The first active stereo image signal comprises a sequence of images L1 and R1 intended to be viewed by the left and the right eyes respectively of the first group of observers, and the second active stereo image signal comprises a sequence of images L2 and R2 intended to be viewed by the left and the right eyes respectively of the second group of observers. An electronic device 142 puts the four different images L1, L2, R1, R2 in the correct order so that left eye images go to projector P1 and right eye images go to projector P2. The left eye projector P1 is equipped with the first filter which filters a parameter of the light in a color selective manner, e.g. color selection filter A, and the right eye projector P2 is equipped with the second filter which filters a parameter of the light in a color selective manner, e.g. color selection filter B. If the observers on both groups wear glasses or obscuration devices as described above, then the first group of observers will see the L1 and R1 images only, because the obscuration devices will be closed when the second set of images L2 and R2 are displayed. For the observers of the second group, the situation is vice versa. Every observer wearing suitable obscuration devices will see a passive stereo image only intended for his eyes.

The shutter in the eyewear of the first group of observers is open when the first set of images is displayed and closed when the second set of images is displayed.

The shutter in the eyewear of the second group of observers is closed when the first set of images is displayed and is open when the second set of images is displayed.

The result is that the first group of observers sees one stereoscopic image and the second group sees another, which may be a completely different, stereoscopic image.

Embodiment 7

This embodiment describes stereoscopic images based on cholesteric filters. The cholesteric filters used in this embodiment can be considered as a special kind of filters which filter a parameter of the light in a color selective manner.

In embodiment 3 the importance of combining two cross-talk reducing filter mechanisms is described. The cross-talk remaining by the use of a first filter mechanism, for instance discrete color bands by the use of overlapping color selective filters, is reduced by the use of a second filter mechanism, for instance polarizing filters.

Figure 11:
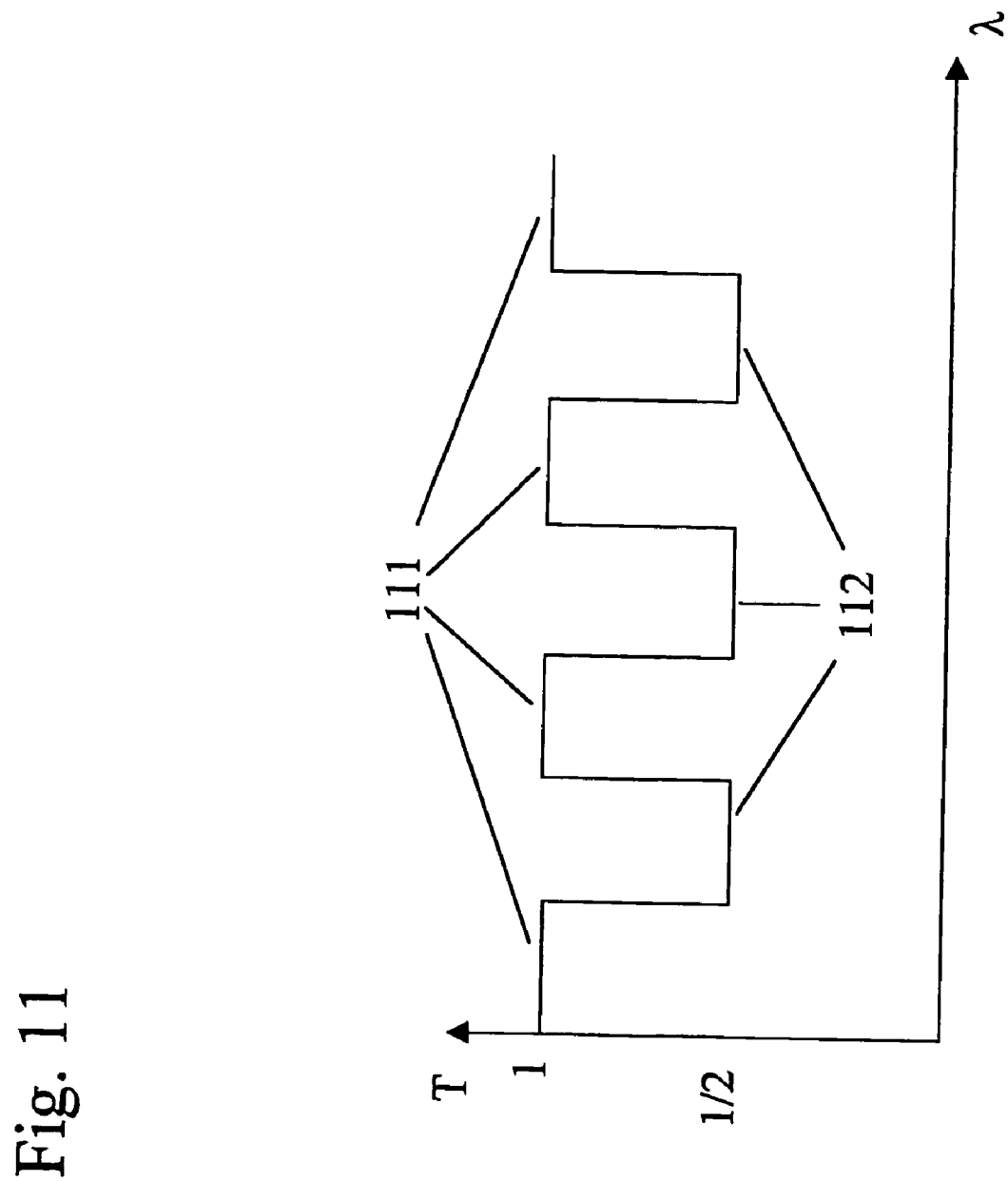
FIG. 11 illustrates a transmission characteristic (relative transmission T as a function of visible wavelength λ) of a cholesteric filter which reflects circular polarized light of one kind within certain wavelength regions, while it transmits all light in the complementary wavelength regions.
Figure 12:
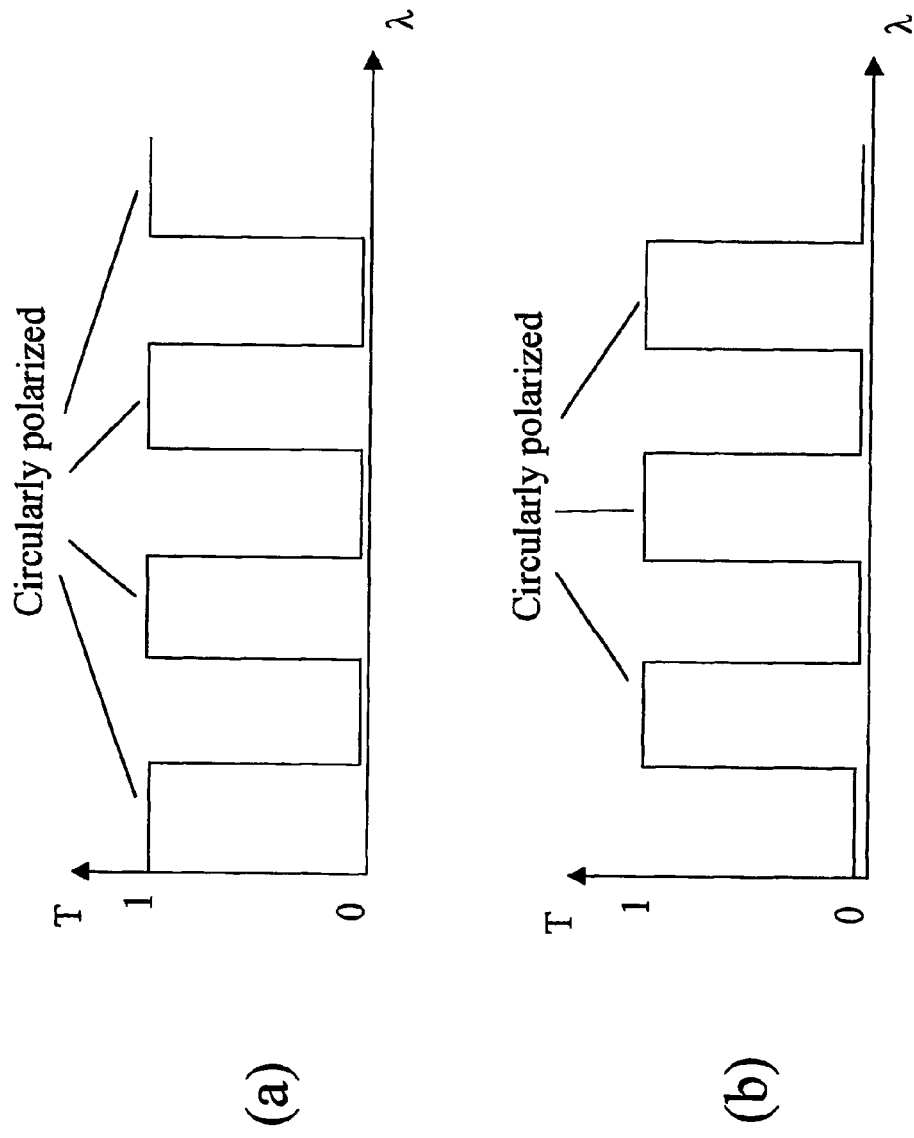
FIG. 12 illustrates the spectrum (relative transmission T as a function of visible wavelength λ) of outgoing light of an LCD or LCoS projector when a cholesteric filter with characteristic as in FIG. 11 is used.

The present embodiment makes use of cholesteric filters to combine these two mechanisms. A cholesteric filter, as for instance produced by Rolic, can be fabricated in such a manner that it reflects circularly polarized light of one kind (left handed or right handed) within certain wavelength regions, while it transmits all light in the complementary wavelength regions. When unpolarized light impinges on such a filter the transmission spectrum may look as in FIG. 11, showing relative transmission T as a function of visible wavelength λ: in some wavelength regions, unpolarized light is transmitted, as indicated by 111 in FIG. 11, while in other wavelength regions, only either left handed or right handed circularly polarized light is transmitted, as indicated by 112 in FIG. 11. In LCD and LCoS projectors the light is linearly polarized. By using a broadband quarterwave retarder, the linear polarization is transformed into circular polarization of a certain handedness. By inserting in the light path of the projector a cholesteric filter with characteristics as described in FIG. 11 the spectrum of the outgoing light will be as in FIG. 12($a$) or as in FIG. 12($b$), depending on which polarization is reflected by the cholesteric filter. The outgoing light of one projector is circularly polarized, left handed or right handed, and has discrete transmission bands. By applying the same filter in front of one eye and the complementary filter (both in polarization and transmission) in front of the other eye all the light of the projector will be transmitted to one eye and blocked to the other. The complementary filter has to be inserted in the light path of the second projector to be able to display stereoscopic images.

The advantage of the present embodiment is the use of one single filter that combines two stereoscopic mechanisms.

Figure 13:
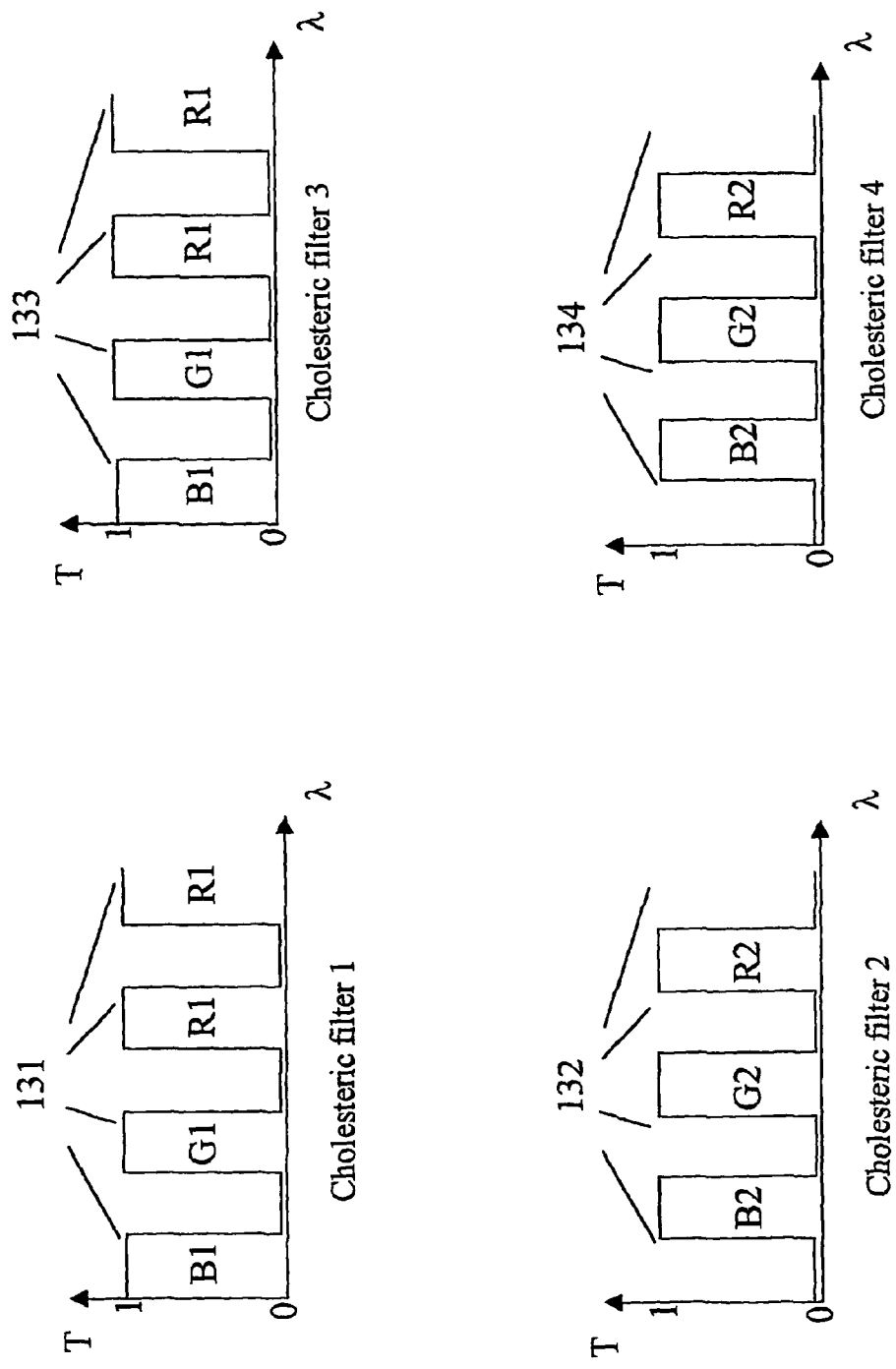
FIG. 13 illustrates the use of different cholesteric filters in different LCD or LCoS projectors.

An extension of this technique is an embodiment for two dual image stereo application: for example four projectors are equipped as follows (as illustrated in FIG. 13, showing relative transmission T as a function of visible wavelength λ)

1) Projector 1 with cholesteric filter 1: this projector transmits left handed circularly polarized light 131 in discrete transmission bands B1, G1 and R1.
2) Projector 2 with cholesteric filter 2: this projector transmits left handed circularly polarized light 132 in discrete transmission bands B2, G2 and R2.
3) Projector 3 with cholesteric filter 3: this projector transmits right handed circularly polarized light 133 in discrete transmission bands B1, G1 and R1.
4) Projector 4 with cholesteric filter 4: this projector transmits right handed circularly polarized light 134 in discrete transmission bands B2, G2 and R2.

The observers are divided into two groups:
1) Group 1 wearing eyewear with cholesteric filter 1 in front of one eye, cholesteric filter 2 in front of the other eye.
2) Group 2 wearing eyewear with cholesteric filter 3 in front of one eye, cholesteric filter 4 in front of the other eye.

The four projectors are all projecting an image on one and the same screen with low depolarization properties.

With the proper supply of images to the four projectors, the first group of observers will see one stereo image and the second group another stereo image.

Embodiment 8

This embodiment describes stereoscopic images based on color selective retarders as for instance ColorSelect® filters from ColorLink Inc, Colorado, USA.

In embodiment 3 the importance of combining two cross-talk reducing filter mechanisms is described. The cross-talk remaining by the use of a first filter mechanism, for instance discrete color bands by the use of overlapping color selective filters, is reduced by the use of a second filter mechanism, for instance polarizing filters.

Figure 15:
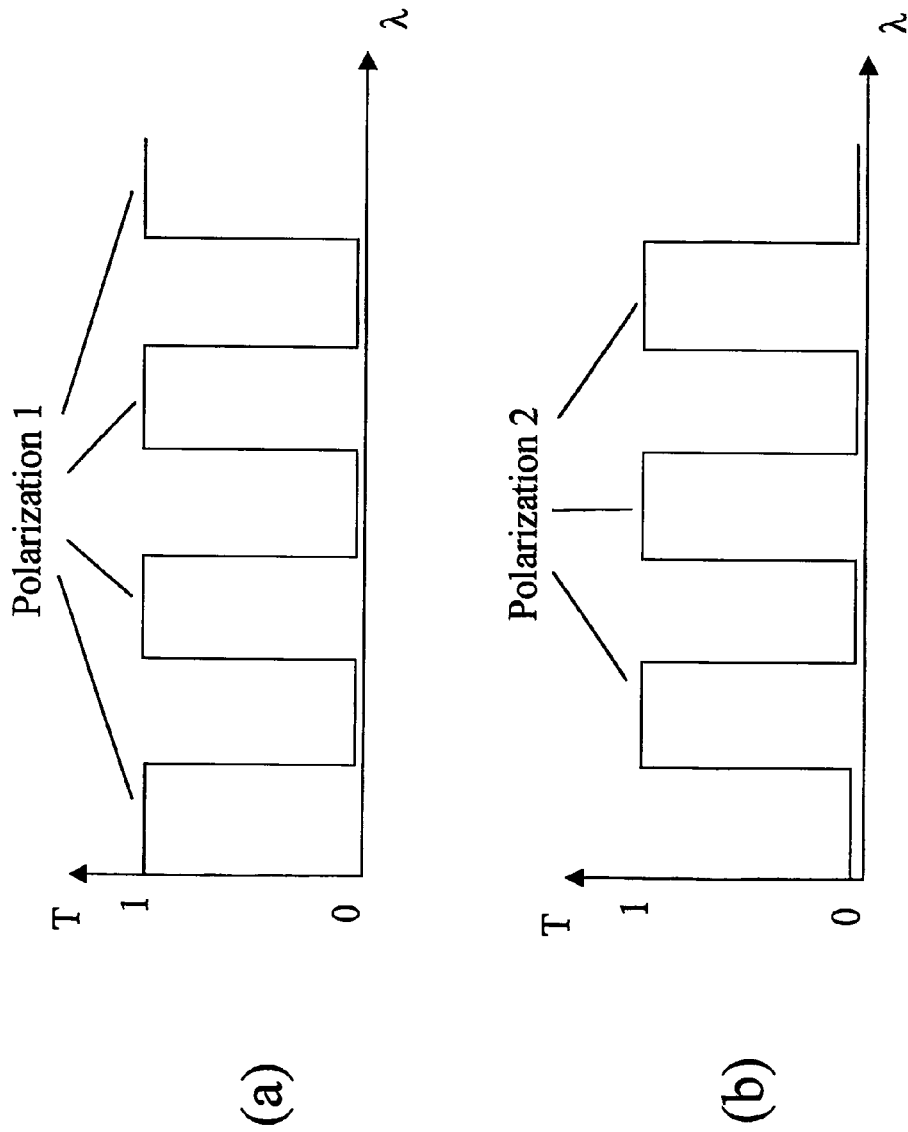
FIG. 15 illustrates the effect on transmission of light when combining a color selective retarder with a polarizer.

The present embodiment makes use of color selective retarders to combine these two mechanisms. A color selective retarder is a special case of a filter which filters a parameter of the light in a color selective manner. A color selective retarder, as for instance produced by ColorLink Inc, can be fabricated in such a manner that it changes the polarization state of the light within a certain wavelength region (or within certain wavelength regions), while it does not change the polarization state of the light outside this wavelength region (or outside certain wavelength regions). By combining such a color selective retarder (or a number of color selective retarders) with a polarizer, the transmission spectrum of the outgoing light of the projector may be as illustrated in FIG. 15($a$) or as in FIG. 15($b$), depending on for example the orientation of the polarizer used in the projector. Polarization 2 in FIG. 15($b$) is orthogonal to polarization 1 in FIG. 15($a$).

Essentially, the outgoing light of the first projector has a certain polarization state on discrete wavelength bands. The outgoing light of the second projector has a polarization state orthogonal to that of the first projector, while its discrete transmission bands are complementary to these of the first projector.

By using a combination of filters which filter a parameter of the light in a color selective manner and polarizers in the eyewear, two crosstalk reducing mechanisms are exploited. This will lead to a high quality of stereoscopic images. However, use of an eyewear configuration in which only the polarizing effect or only the discrete transmission filter effect is used, is also possible to achieve stereoscopic images.

An advantage of the present embodiment is that a change of polarizer (from polarization 1 to polarization 2 in FIG. 15) is sufficient to achieve complementary filter characteristics. Another advantage is that color selective retarders can easily be stacked to achieve the desired filter characteristic.

Figure 16:
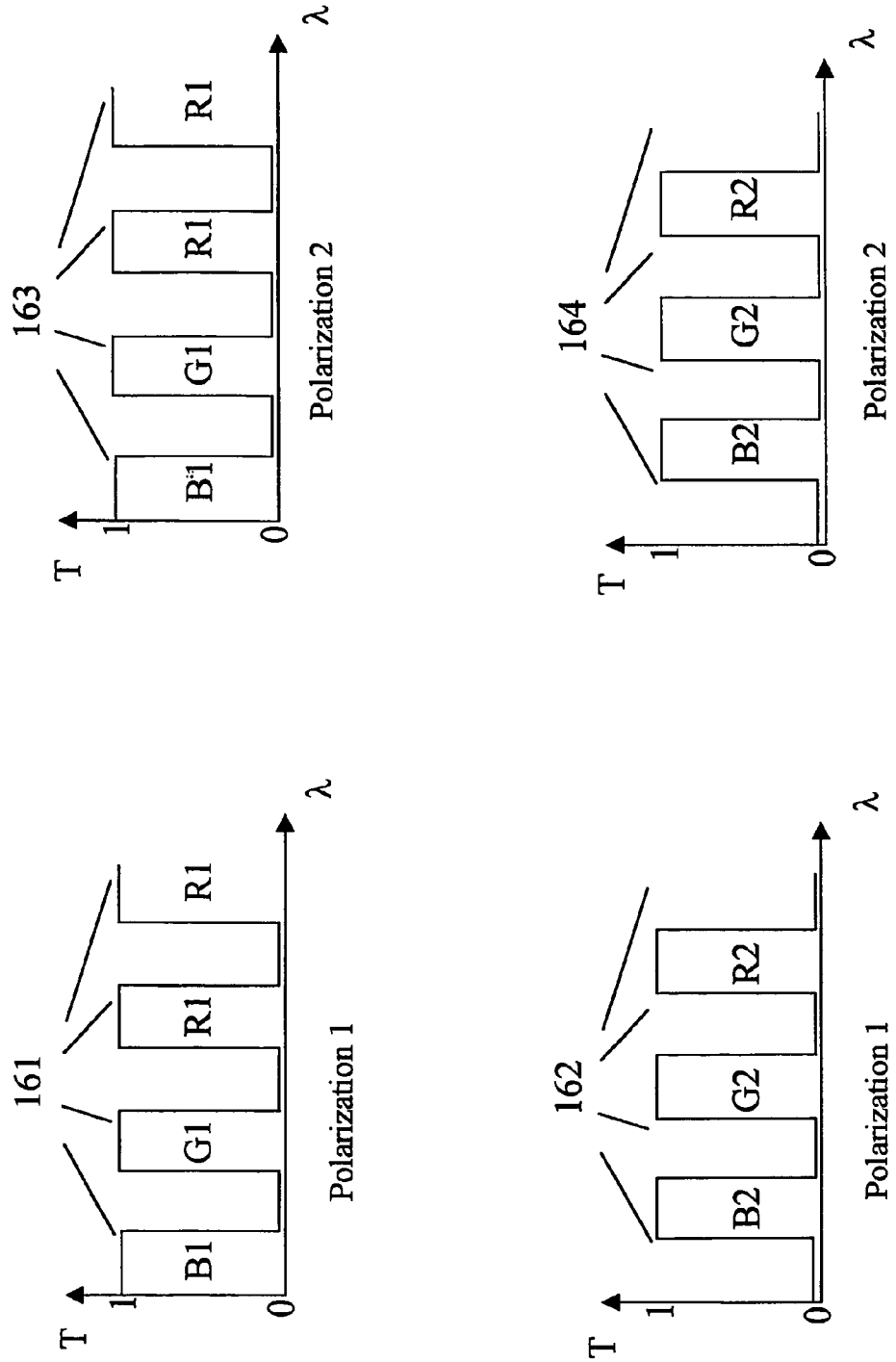
FIG. 16 illustrates the spectra of a plurality of projection devices for dual image stereo, when a combination of selective retarders and polarizers is used.

An extension of this technique is an embodiment for a dual image stereo application: for example four projectors are equipped as follows (as illustrated in FIG. 16, showing relative transmission T as a function of visible wavelength λ)

1) Projector 1 with color selective retarder and polarizer P1: this projector transmits polarized light 161 of a first polarization type in discrete transmission bands B1, G1 and R1.
2) Projector 2 with color selective retarder and polarizer P1: this projector transmits polarized light 162 of the first polarization type in discrete transmission bands B2, G2 and R2.
3) Projector 3 with color selective retarder and polarizer P2: this projector transmits polarized light 163 of a second polarization type in discrete transmission bands B1, G1 and R1.
4) Projector 4 with color selective retarder and polarizer P2: this projector transmits polarized light 164 of the second polarization type in discrete transmission bands B2, G2 and R2.

The four projectors are all projecting an image on one and the same screen with low depolarization properties.

The observers are divided into two groups:

1) Group 1 wearing eyewear with polarizer P1 in front of one eye and polarizer P2 in front of the other eye, both eyewear filters having transmission bands B1, G1, R1.
2) Group 2 wearing eyewear with polarizer P1 in front of one eye and polarizer P2 in front of the other eye, both eyewear filters having transmission bands B2, G2, R2.

With the proper supply of images to the four projectors, the first group of observers will see one stereo image and the second group another stereo image.

While the invention has been shown and described with reference to preferred embodiments, it will be understood by those skilled in the art that various changes or modifications in form and detail may be made without departing from the scope and spirit of this invention.

What is claimed is the following:

1. A stereoscopic projection system comprising a projection device with at least one filter which filters a parameter of the light in a color selective manner, said filtering in a color selective manner being for obtaining the stereoscopic effect of the stereoscopic images for a left eye and a right eye, respectively, the at least one filter having a spectral characteristic for simultaneously transmitting light in a first set of wavelength bands and for simultaneously reflecting or absorbing light in a second set of wavelength bands, wherein the projection device comprises a means for fast synchronized switching between light in different wavelength bands or sets of wavelength bands.

2. A stereoscopic projection system according to claim 1, comprising a projection device with at least a first filter which filters a parameter of the light in a color selective manner with a first spectral characteristic and a second filter which filters a parameter of the light in a color selective manner with a second spectral characteristic, wherein the projection device comprises a means for fast synchronized switching between the at least first and second filters.

3. A stereoscopic projection system according to claim 1, the projection device projecting images for a left eye and images for a right eye, the stereoscopic projection system furthermore comprising a passive obscuration device for discriminating between the images for the left eye and the images for the right eye.

4. A stereoscopic projection system according to claim 2, wherein the means for fast synchronized switching comprises a rotating wheel with at least one set of the first and second filters.

5. A stereoscopic projection system according to claim 2, wherein the means for fast synchronized switching comprises a sliding filter with at least one set of the first and second filters.

6. A stereoscopic projection system according to claim 2, wherein the means for fast synchronized switching comprises a solid state filter that can switch from a first characteristic to a second characteristic with a switching time below 5 ms.

7. A stereoscopic projection system according to claim 2, wherein the means for fast synchronized switching comprises a stack of switchable cholesteric filters.

8. A stereoscopic projection system according to claim 1, wherein the at least one filter is a first filter for splitting light in a first light path and a second light path, the means for fast synchronized switching comprising a first shutter in the first light path and a second shutter in the second light path, the operation of the shutters being linked so that the first shutter closes when the second shutter opens and vice versa.

9. A stereoscopic projection system according to claim 8, furthermore comprising a further filter with a characteristic substantially similar to the spectral characteristic of the first filter, the further filter being for combining light from the first and second lightpaths onto a combined lightpath.

10. A stereoscopic projection system according to claim 1, the at least one filter having a spectral characteristic for transmitting light in a first set of wavelength bands and for reflecting or absorbing light in a second set of wavelength bands, wherein the at least one filter has components in three primary color regions.

11. A stereoscopic projection system according to claim 1, furthermore comprising means for electronically compensating for color differences between a plurality of signals originating from the projection device.

12. A stereoscopic projection system according to claim 1, furthermore comprising means for reducing cross-talk in the most photopically contributing color channel of the projection device.

13. A stereoscopic projection system according to claim 12, wherein the means for reducing cross-talk comprises a first filter which filters a parameter of the light in a color selective manner in the most photopically contributing color channel of the first projection device, and a second filter which filters a parameter of the light in a color selective manner in the most photopically contributing color channel of the second projection device, the first and the second filters showing no overlap in the most photopically contributing color channel.

14. A stereoscopic projection system according to claim 1, wherein the projection device is equipped with a light source with a substantially flat spectral distribution.

15. A stereoscopic projection system according to claim 14, wherein the projection device is furthermore equipped with a set of filters such that the combination of light source and set of filters of the projection device is such that the light which is projected by the projection device onto the common screen can be discriminated by means of an adjusted obscuration device.

16. A stereoscopic projection system according to claim 15, wherein the light source and the set of filters of the projection device are such that a multiplication of the spectral distributions of the light projected by the projection device onto the common screen is substantially close to zero.

17. A stereoscopic projection system according to claim 15, wherein the set of filters are stereo filters.

18. A stereoscopic projection system according to claim 17, wherein the set of filters are color filters.

19. A stereoscopic projection system according to claim 14, furthermore comprising means for electronically compensating for color differences between light projected from each of the at least two projection devices.

20. A stereoscopic projection system according to claim 1, comprising a plurality of stereo projection devices for multiple image stereo applications.

21. A stereoscopic projection system according to claim 1, wherein said filtering in a color selective manner reaches a common color gamut for the images for the left and right eye.

22. A stereoscopic projection system comprising a projection device with at least one filter which filters a parameter of the light in a color selective manner, said filtering in a color selective manner being for obtaining the stereoscopic effect of the stereoscopic images for a left eye and a right eye, respectively, the at least one filter having a spectral characteristic for simultaneously transmitting light in a first set of wavelength bands and for simultaneously reflecting or absorbing light in a second set of wavelength bands, wherein the projection device comprises a means for fast synchronized switching between light in different wavelength bands or sets of wavelength bands, wherein the system furthermore comprises means for electronically compensating for color differences between a plurality of signals originating from the projection device or projection devices.

23. A stereoscopic projection system according to claim 22, wherein the means for electronically compensating for color differences between a plurality of signals originating from the projection device comprises means for switching on a left image-right image basis.

24. A stereoscopic projection system according to claim 22, wherein the system is adapted for converting said plurality of signals to correspond with a single color gamut.

25. A stereoscopic projection system according to claim 23, wherein the system is adapted for converting said plurality of signals to correspond with a single color gamut.

* * * * *